US008256665B2

(12) United States Patent
Rhoads

(10) Patent No.: US 8,256,665 B2
(45) Date of Patent: *Sep. 4, 2012

(54) METHODS AND SYSTEMS FOR INTERACTING WITH PHYSICAL OBJECTS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/953,190

(22) Filed: Nov. 23, 2010

(65) Prior Publication Data

US 2011/0062229 A1  Mar. 17, 2011

Related U.S. Application Data

(60) Continuation of application No. 12/633,646, filed on Dec. 8, 2009, now Pat. No. 7,837,094, which is a division of application No. 12/126,730, filed on May 23, 2008, now Pat. No. 7,628,320, which is a continuation of application No. 10/817,456, filed on Apr. 2, 2004, now Pat. No. 7,377,421, which is a continuation of application No. 10/717,211, filed on Nov. 18, 2003, now abandoned, which is a continuation of application No. 09/342,688, filed on Jun. 29, 1999, now Pat. No. 6,650,761, which is a continuation-in-part of application No. 09/314,648, filed on May 19, 1999, now Pat. No. 6,681,028.

(60) Provisional application No. 60/134,782, filed on May 19, 1999.

(51) Int. Cl.
*G06F 17/00* (2006.01)
(52) U.S. Cl. .......................... 235/375; 235/487; 235/470
(58) Field of Classification Search .................. 235/375, 235/382, 383, 470, 485–487, 472, 472.01
See application file for complete search history.

(56) References Cited

U.S. PATENT DOCUMENTS

| 4,908,873 A | 3/1990 | Philibert et al. |
| 5,177,608 A | 1/1993 | Ohki et al. |
| 5,257,119 A | 10/1993 | Funada et al. |
| 5,385,371 A | 1/1995 | Izawa |
| 5,479,587 A | 12/1995 | Campbell |
| 5,486,686 A | 1/1996 | Zdybel, Jr. et al. |
| 5,500,673 A | 3/1996 | Zhou |
| 5,678,155 A | 10/1997 | Miyaza |
| 5,684,999 A | 11/1997 | Okamoto |
| 5,729,471 A | 3/1998 | Jain et al. |
| 5,841,978 A | 11/1998 | Rhoads |
| 5,862,260 A | 1/1999 | Rhoads |
| 5,902,353 A | 5/1999 | Reber et al. |

(Continued)

OTHER PUBLICATIONS

U.S. Appl. No. 09/343,101, filed Jun. 29, 1999, Bruce L. Davis, et al.

(Continued)

*Primary Examiner* — Edwyn Labaze

(57) ABSTRACT

A camera, of a handheld computing device, is used to capture a picture of an object. At least some image data corresponding to the captured picture is provided to a processor, which returns processed information corresponding to the object. By reference to this processed information, the system automatically identifies a particular one of plural different software application programs—a program that is particularly relevant to the object, rather than being generally relevant to all objects. Output information is then produced using the identified software application program, which is then presented to the user, e.g., on a screen of the handheld computing device. A great number of other features and arrangements are also detailed.

43 Claims, 2 Drawing Sheets

U.S. PATENT DOCUMENTS

| | | | |
|---|---|---|---|
| 5,905,248 A | 5/1999 | Russell et al. |
| 5,932,863 A | 8/1999 | Rathus |
| 5,933,829 A | 8/1999 | Durst |
| 5,938,727 A | 8/1999 | Ikeda |
| 5,978,773 A | 11/1999 | Hudetz |
| 5,986,651 A | 11/1999 | Reber et al. |
| 5,992,752 A | 11/1999 | Wilz |
| 5,995,105 A | 11/1999 | Reber et al. |
| 6,002,946 A | 12/1999 | Reber |
| 6,032,195 A | 2/2000 | Reber |
| 6,084,528 A | 7/2000 | Beach et al. |
| 6,108,437 A | 8/2000 | Lin |
| 6,111,517 A | 8/2000 | Atick et al. |
| 6,122,403 A | 9/2000 | Rhoads |
| 6,148,331 A | 11/2000 | Parry |
| 6,188,777 B1 | 2/2001 | Darrell et al. |
| 6,229,924 B1 | 5/2001 | Rhoads et al. |
| 6,249,226 B1 | 6/2001 | Harrison et al. |
| 6,286,036 B1 | 9/2001 | Rhoads |
| 6,298,145 B1 | 10/2001 | Zhang et al. |
| 6,298,176 B2 | 10/2001 | Longacre |
| 6,307,949 B1 | 10/2001 | Rhoads |
| 6,311,214 B1 | 10/2001 | Rhoads |
| 6,324,573 B1 | 11/2001 | Rhoads |
| 6,325,420 B1 | 12/2001 | Zhang et al. |
| 6,327,395 B1 | 12/2001 | Hecht et al. |
| 6,381,341 B1 | 4/2002 | Rhoads |
| 6,385,329 B1 | 5/2002 | Sharma et al. |
| 6,386,453 B1 | 5/2002 | Russell |
| 6,400,272 B1 | 6/2002 | Holtzman et al. |
| 6,408,082 B1 | 6/2002 | Rhoads et al. |
| 6,408,331 B1 | 6/2002 | Rhoads |
| 6,421,070 B1 | 7/2002 | Ramos et al. |
| 6,424,725 B1 | 7/2002 | Rhoads et al. |
| 6,466,329 B1 | 10/2002 | Mukai |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,549,933 B1 | 4/2003 | Barrett |
| 6,553,129 B1 | 4/2003 | Rhoads |
| 6,563,955 B2 | 5/2003 | De Queiroz |
| 6,567,533 B1 | 5/2003 | Rhoads |
| 6,580,808 B2 | 6/2003 | Rhoads |
| 6,590,996 B1 | 7/2003 | Reed et al. |
| 6,593,956 B1 | 7/2003 | Potts et al. |
| 6,611,607 B1 | 8/2003 | Davis et al. |
| 6,614,914 B1 | 9/2003 | Rhoads et al. |
| 6,618,553 B1 | 9/2003 | Shiohara |
| 6,633,655 B1 | 10/2003 | Hong et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,651,053 B1 | 11/2003 | Rothschild |
| 6,674,993 B1 | 1/2004 | Tarbouriech |
| 6,681,028 B2 | 1/2004 | Rodriguez et al. |
| 6,681,029 B1 | 1/2004 | Rhoads |
| 6,687,345 B1 | 2/2004 | Swartz |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,721,733 B2 | 4/2004 | Lipson et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,775,392 B1 | 8/2004 | Rhoads |
| 6,786,397 B2 | 9/2004 | Silverbrook et al. |
| 6,798,894 B2 | 9/2004 | Rhoads |
| 6,813,366 B1 | 11/2004 | Rhoads |
| 6,879,701 B1 | 4/2005 | Rhoads |
| 6,917,724 B2 | 7/2005 | Seder et al. |
| 6,920,232 B2 | 7/2005 | Rhoads |
| 6,947,571 B1 | 9/2005 | Rhoads et al. |
| 6,965,682 B1 | 11/2005 | Davis |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,055,166 B1 | 5/2006 | Logan et al. |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,224,995 B2 | 5/2007 | Rhoads |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,346,472 B1 | 3/2008 | Moskowitz et al. |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,564,992 B2 | 7/2009 | Rhoads |
| RE40,919 E | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 2001/0011233 A1 | 8/2001 | Narayanaswami |
| 2001/0034705 A1 | 10/2001 | Rhoads et al. |
| 2001/0055407 A1 | 12/2001 | Rhoads |
| 2002/0009208 A1 | 1/2002 | Alattar et al. |

| | | |
|---|---|---|
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0155100 A1 * | 8/2004 | Imaizumi et al. ............. 235/375 |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0167754 A1 * | 7/2006 | Carro et al. ................... 705/26 |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2011/0007936 A1 | 1/2011 | Rhoads |

OTHER PUBLICATIONS

U.S. Appl. No. 09/343,104, filed Jun. 29, 1999, Tony F. Rodriguez, et al.

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/538,493, filed Mar. 30, 2000, Geoffrey B. Rhoads.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,009, filed Oct. 25, 2000, Bruce L. Davis, et al.

U.S. Appl. No. 09/697,015, filed Oct. 25, 2000, Bruce L Davis, et al.

U.S. Appl. No. 12/852,253, filed Aug. 6, 2010, Geoffrey B. Rhoads, et al.

U.S. Appl. No. 12/872,989, filed Aug. 31, 2010, Geoffrey B Rhoads.

U.S. Appl. No. 12/912,461, filed Oct. 26, 2010, Adnan M. Alattar.

U.S. Appl. No. 12/953,190, filed Nov. 23, 2010, Geoffrey B. Rhoads.

* cited by examiner

METHODS AND SYSTEMS FOR INTERACTING WITH PHYSICAL OBJECTS

CROSS-REFERENCE TO RELATED PATENT APPLICATIONS

This application is a continuation of application Ser. No. 12/633,636, filed on Dec. 8, 2009 (now U.S. Pat. No. 7,837,094), which is a division of application Ser. No. 12/126,730, filed May 23, 2008 (now U.S. Pat. No. 7,628,320), which is a continuation of application Ser. No. 10/817,456, filed Apr. 2, 2004 (now U.S. Pat. No. 7,377,421), which is a continuation of application Ser. No. 10/717,211, filed Nov. 18, 2003 (now abandoned), which is a continuation of application Ser. No. 09/342,688, filed Jun. 29, 1999 (now U.S. Pat. No. 6,650,761), which claims priority to provisional application 60/134,782, filed May 19, 1999 (attached as Appendix A hereto). Application Ser. No. 09/342,688 is also a continuation-in part of application Ser. No. 09/314,648, filed May 19, 1999 (now U.S. Pat. No. 6,681,028).

TECHNICAL FIELD

The present technology relates to methods and systems for interacting with physical objects.

SUMMARY

One aspect of the present technology is a method of interacting with a physical object. The method includes using a camera of a handheld computing device to capture a picture of the object. At least some image data corresponding to the captured picture is provided to a processor, which returns processed information corresponding to the object. By reference to this processed information, the method automatically identifies a particular one of plural different software application programs—a program that is particularly relevant to the object, rather than being generally relevant to all objects. Output information is then produced using the identified software application program, which is then presented to the user, e.g., on a screen of the handheld computing device.

Another aspect is similar. However, instead of identifying a single software application program that is particularly relevant to the object, several are identified to the user. The user then selects which of these several programs should be run.

Yet another aspect of the present technology is a handheld computing device that practices the methods noted above. Still another aspect is a computer program product that includes software instructions for causing a handheld computing device to practice the methods noted above.

The foregoing and other features, aspects and advantages of the present technology will be more readily apparent from the following Detailed Description, which proceeds with reference to the accompanying drawings.

DETAILED DESCRIPTION

Basically, the technology detailed in this disclosure may be regarded as enhanced systems by which users can interact with computer-based devices. Their simple nature, and adaptability for use with everyday objects (e.g., milk cartons), makes the disclosed technology well suited for countless applications.

Due to the great range and variety of subject matter detailed in this disclosure, an orderly presentation is difficult to achieve. As will be evident, many of the topical sections presented below are both founded on, and foundational to, other sections. For want of a better rationale, the sections are presented below in a more or less random order. It should be recognized that both the general principles and the particular details from each section find application in other sections as well. To prevent the length of this disclosure from ballooning out of control, the various permutations and combinations of the features of the different sections are not exhaustively detailed. The inventors intend to explicitly teach such combinations/permutations, but practicality requires that the detailed synthesis be left to those who ultimately implement systems in accordance with such teachings.

Basic Principles—Refrigerators and Clutter

Figure 1:
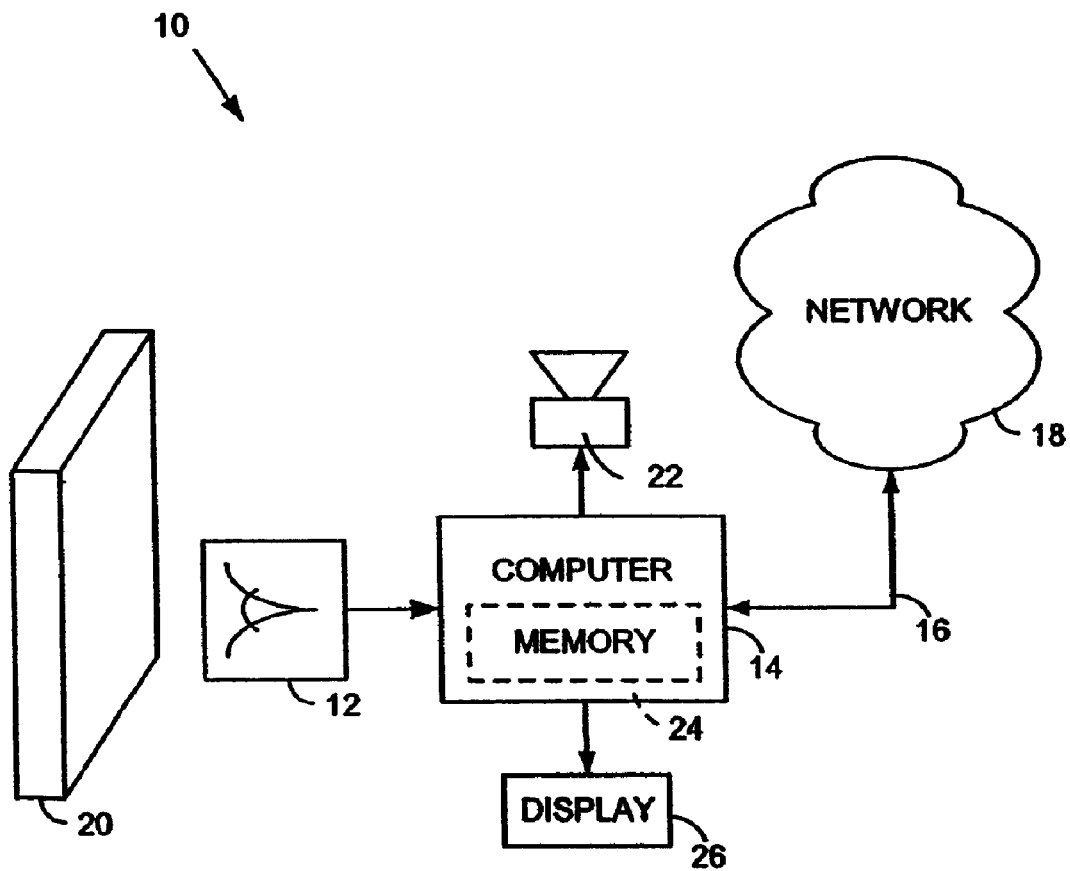
FIG. 1 is a block diagram showing one embodiment of an arrangement detailed herein.

Referring to FIG. 1, a basic embodiment 10 of the present technology includes an optical sensor 12, a computer 14, and a network connection 16 to the internet 18. The illustrated optical sensor 12 is a digital camera having a resolution of 320 by 200 pixels (color or black and white) that stares out, grabbing frames of image data five times per second and storing same in one or more frame buffers. These frames of image data are analyzed by a computer 14 for the presence of Bedoop data. (Essentially, Bedoop data is any form of digital data encoding recognized by the system 10—data which, in many embodiments, initiates some action.) Once detected, the system responds in accordance with the detected Bedoop data (e.g., by initiating some local action, or by communication with a remote computer, such as over the internet, via an online service such as AOL, or using point-to-point dial-up communications, as with a bulletin board system.

Consider the milk carton example. The artwork on a milk carton can be adapted to convey Bedoop data. In the preferred embodiment, the Bedoop data is steganographically encoded (e.g., digitally watermarked) on the carton. Numerous digital watermarking techniques are known—all of which convey data in a hidden form (i.e., on human inspection, it is not apparent that digitally encoded data is present). Exemplary techniques operate by slightly changing the luminance, or contours, of selected points on artwork or text printed on the carton, or splatter tiny droplets of ink on the carton in a seemingly random pattern. Each of these techniques has the effect of changing the local luminance at areas across the carton—luminance changes that can be detected by the computer 14 and decoded to extract the encoded digital data. In the case of a milk carton, the data may serve to identify the object as, e.g., a half gallon carton of Alpenrose brand skim milk.

The FIG. 1 apparatus can be integrated into the door of a refrigerator and used to compile a shopping list. Milk cartons, and other Bedoop-encoded packaging 20, can be held up the optical sensor. When the computer 14 detects the presence of Bedoop data and successfully decodes same, it issues a confirmation tone ("be-doop") from a speaker or other audio transducer 22. The computer then adds data identifying the just-detected object to a grocery list. This list can be maintained locally (in disk storage, non-volatile RAM 24, or the like in the refrigerator, or elsewhere in the home), or remotely (e.g., at a server located at a user-selected grocery, or elsewhere). In either event, the list is desirably displayed on a display in the user's home (e.g., an LCD screen 26 built into the front of the appliance). Conventional user interface techniques can be employed permitting the user to scroll through the displayed list, delete items as desired, etc.

Periodically, the listed groceries can be purchased and the list cleared. In one embodiment, the list is printed (either at the home or at the grocery), and the user walks the grocery aisles and purchases same in the conventional manner. In another embodiment, the grocer pulls the listed items from the shelves (in response to a user request conveyed by the internet or telephone, or by a gesture as hereafter detailed). Once the list has been pulled, the grocer can alert the user that the groceries are available for pickup (again, e.g., by internet or telephone message), or the grocer can simply deliver the groceries directly to the user's home. Naturally, on-line payment mechanisms can be employed if desired.

Consider a wholly unrelated Bedoop application. An Excel spreadsheet is printed onto paper, and the paper becomes buried in a stack of clutter on an office worker's desk. Months later the spreadsheet again becomes relevant and is dug out of the stack. Changes need to be made to the data, but the file name has long-since been forgotten. The worker simply holds the dug-out page in front of a camera associated with the desktop computer. A moment later, the electronic version of the file appears on the worker's computer display.

When the page was originally printed, tiny droplets of ink or toner were distributed across the paper in a pattern so light as to be essentially un-noticeable, but which steganographically encoded the page with a plural-bit binary number (e.g., 64 bits). A database (e.g., maintained by the operating system, the Excel program, the printer driver, etc.) stored part of this number (e.g., 24 bits, termed a Universal Identifier or UID) in association with the path and file name at which the electronic version of the file was stored, the page number within the document, and other useful information (e.g., author of the file, creation date, etc.).

The steganographic encoding of the document, and the updating of the database, can be performed by the software application (e.g., Excel). This option can be selected once by the user and applied thereafter to all printed documents (e.g., by a user selection on an "Options" drop-down menu), or can be presented to the user as part of the Print dialog window and selected (or not) for each print job.

When such a printed page is later presented to the camera, the computer automatically detects the presence of the encoded data on the page, decodes same, consults the database to identify the file name/location/page corresponding to the UID data, and opens the identified file to the correct page (e.g., after launching Excel). This application is one of many "paper as portal" applications of the Bedoop technology.

The foregoing are but two of myriad applications of the technology detailed herein. In the following discussion a great many other applications are disclosed (some groundbreaking, a few gimmicky). However, regardless of the length of the specification, it is possible only to begin to explore a few of the vast ramifications of this technology.

A few more details on the basic embodiments described above may be helpful before delving into other applications.
Optics For any system to decode steganographically encoded data from an object, the image of the object must be adequately focused on the digital camera's CCD (or other) sensor. In a low cost embodiment, the camera has a fixed nominal focal length, e.g., in the range of 6-24 inches (greater or lesser lengths can of course be used). Since the camera is continuously grabbing and analyzing frames of data, the user can move the object towards- or away-from the sensor until the decoder succeeds in decoding the steganographically encoded data and issues a confirming "Bedoop" audio signal.

In more elaborate embodiments, known auto-focusing technology can be employed.

In still other embodiments, the camera (or other sensor) can be equipped with one or more auxiliary fixed-focus lenses that can be selectively used, depending on the particular application. Some such embodiments have a first fixed focused lens that always overlies the sensor, with which one or more auxiliary lenses can be optically cascaded (e.g., by hinge or slide arrangements). Such arrangements are desirable, e.g., when a camera is not a dedicated Bedoop sensor but also performs other imaging tasks. When the camera is to be used for Bedoop, the auxiliary lens is positioned (e.g., flipped into) place, changing the focal length of the first lens (which may by unsuitably long for Bedoop purposes, such as infinity) to an appropriate Bedoop imaging range (such as one foot). Other lens-switching embodiments do not employ a fixed lens that always overlies the sensor, but instead employ two or more lenses that can be moved into place over the sensor. By selecting different lenses, focal lengths such as infinity, six feet, and one foot can be selected.

In all such arrangements, it is desirable (but not essential) that the steganographically-encoded portion of the object being imaged fills a substantial part of the image frame. The object can be of various sizes, e.g., an 10 by 12 inch front panel of a cereal box, or a proof of purchase certificate that is just one inch square. To meet this requirement, small objects will obviously need to be placed closer to the camera than large objects. The optics of the system can be designed, e.g., by selection of suitable aperture sizing and auxiliary lighting (if needed), to properly image objects of various sizes within a range of focal distances.

Some embodiments avoid issues of focal distances and identifying the intended object by constraining the size of the object and/or its placement. An example is a business card reader that is designed for the sole task of imaging business cards. Various such devices are known.
Decoding/Encoding The analysis of the image data can be accomplished in various known ways. Presently, most steganographic decoding relies on general purpose microprocessors that are programmed by suitable software instructions to perform the necessary analysis. Other arrangements, such as using dedicated hardware, reprogrammable gate arrays, or other techniques, can of course be used.

The steganographic decoding process may entail three steps. In the first, the object is located. In the second, the object's orientation is discerned. In the third, the Bedoop data is extracted from the image data corresponding to the Bedoop object.

The first step, object location, can be assisted by various clues. One is the placement of the object; typically the center of the image field will be a point on the object. The surrounding data can then be analyzed to try and discern the object's boundaries.

Another location technique is slight movement. Although the user will typically try to hold the object still, there will usually be some jitter of the Bedoop object within the image frame (e.g., a few pixels back and forth). Background visual clutter, in contrast, will typically be stationary. Such movement may thus be sensed and used to identify the Bedoop object from within the image data.

Still another object-location clue is object shape. Many Bedoop objects are rectangular in shape (or trapezoidal as viewed by the camera). Straight edge boundaries can thus be used to define an area of likely Bedoop data.

Color is a further object identification clue that may be useful in some contexts.

Yet another object location clue is spatial frequency. In imaging systems with well defined focal zones, undesired visual clutter may be at focal distances that results in blurring. The Bedoop object, in contrast, will be in focus and may be characterized by fine detail. Analyzing the image data for the high frequencies associated with fine detail can be used to distinguish the intended object from others.

Characteristic markings on the object (as discussed below in connection with determining object orientation), can also be sensed and used in locating the object.

Once the Bedoop object has been located within the image data, masking can be applied (if desired) to eliminate image data not corresponding to the intended object.

The second step in the decoding process—determining orientation of the Bedoop data—can likewise be discerned by reference to visual clues. For example, some objects include subliminal graticule data, or other calibration data, steganographically encoded with the Bedoop data to aid in determining orientation. Others can employ overt markings, either placed for that sole purpose (e.g. reference lines or fiducials), or serving another purpose as well (e.g. lines of text), to discern orientation. Edge-detection algorithms can also be employed to deduce the orientation of the object by reference to its edges.

Some embodiments filter the image data at some point in the process to aid in ultimate Bedoop data extraction. One use of such filtering is to mitigate image data artifacts due to the particular optical sensor. For example, CCD arrays have regularly-spaced sensors that sample the optical image at uniformly spaced discrete points. This discrete sampling effects a transformation of the image data, leading to certain image artifacts. An appropriately configured filter can mitigate the effect of these artifacts.

(In some arrangements, the step of determining the orientation can be omitted. Business card readers, for example, produce data that is reliably free of artifacts and is of known scale. Or the encoding of the Bedoop data can be effected in such a way that renders it relatively immune to certain distortion mechanisms. For example, while the presently-preferred encoding arrangement operates on a 2D grid basis, with rows and columns of data points, the encoding can alternatively be done on another basis (e.g., a rotationally-symmetric form of encoding, such as a 2D bar-code, so that rotational state of the image data can be ignored). In still other embodiments, the orientation-determining step can be omitted because the decoding can readily proceed without this information. For example decoding which relies on the Fourier-Mellin transform produces data in which scale and rotation can be ignored.)

Once the orientation of the object is discerned, the image data may be virtually re-registered, effectively mapping it to another perspective (e.g., onto a rectilinear image plane). This mapping can employ known image processing techniques to compensate, e.g., for rotation state, scale state, differential scale state, and X-Y offset, of the original Bedoop image data. The resulting frame of data may then be more readily processed to extract the steganographically-encoded Bedoop data.

In the preferred embodiment, after the image data is remapped into rectilinear planar form, subliminal graticule data is sensed that identifies the locations within the image data where the binary data is encoded. Desirably, the binary data is redundantly encoded, e.g., in 8.times.8 patch blocks. Each patch comprises one or more pixels. (The patches are typically square, and thus contain 1, 4, 9, or 16, etc. pixels.) The nominal luminance of each patch before encoding (e.g., artwork pre-existing on the object) is slightly increased or decreased to encode a binary "1" or "0." The change is slight enough to be generally imperceptible to human observers, yet statistically detectable from the image data—especially if several such blocks are available for analysis. Preferably, the degree of change is adapted to the character of the underlying image, with relatively greater changes being made in regions where the human eye is less likely to notice them. Each block thus encoded can convey 64 bits of data. The encoding of such blocks in tiled fashion across the object permits the data to be conveyed in robust fashion.

Much of the time, of course, the Bedoop sensor is staring out and grabbing image frames that have no Bedoop data. Desirably, the detection process includes one or more checks to assure that Bedoop data is not wrongly discerned from non-Bedoop image data. Various techniques can be employed to validate the decoded data, e.g., error detecting codes can be included in the Bedoop payload and checked to confirm correspondence with the other Bedoop payload. Likewise, the system can confirm that the same Bedoop data is present in different tiled excerpts within the image data, etc.

(Details of the preferred encoding techniques are further detailed in U.S. Pat. Nos. 5,862,260, 6,345,104 and 6,427,020.)

Data Structures, Formats, Protocols, and Infrastructures

In an exemplary system, the Bedoop data payload is 64 bits. This payload is divided into three fields CLASS (12 bits), DNS (24 bits) and UID (24 bits). (Other payload lengths, fields, and divisions, are of course possible, as is the provision of error-checking or error-correcting bits.)

Within the above-described eight patch-by-eight patch data block, the bits are ordered row by row, starting with the upper left patch. The first 12 bits are the CLASS ID, followed by 24 bits of DNS data followed by 24 bits of UID data. (In other embodiments, the placement of bits comprising these three fields can be scrambled throughout the block.)

Briefly, the CLASS ID is the most rudimentary division of Bedoop data, and may be analogized, in the familiar internet taxonomy, to the limited number of top level domains (e.g., .com, .net, .org, .mil, .edu, .jp, .de, .uk, etc.). It is basically an indicator of object type. The DNS ID is an intermediate level of data, and may be analogized to internet server addresses (e.g., biz.yahoo, interactive.wsj, etc.) The UID is the finest level of granularity, and can roughly be analogized to internet pages on a particular server (e.g., edition/current/summaries/front.htm, daily/home/default.hts, etc.).

Generally speaking, the CLASS ID and DNS ID, collectively, indicate to the system what sort of Bedoop data is on the object. In the case of Bedoop systems that rely on remote servers, the CLASS and DNS IDs are used in identifying the server computer that will respond to the Bedoop data. The UID determines precisely what response should be provided.

In the case of a refrigerator Bedoop system, what happens if an object with an unfamiliar CLASS/DNS ID data is encountered? The system can be programmed not to respond at all, or to respond with a raspberry-like sound (or other feedback) indicating "I see a Bedoop object but don't know what to do with it."

Most systems will be able to respond to several classes of Bedoop objects. Simple software-based systems can compare the CLASS/DNS ID (and optionally the UID) to fixed values, and can branch program execution to corresponding subroutines. Likewise, hardware-based systems can activate different circuitry depending on the detected CLASS/DNS ID.

In the case of a computer equipped with a Bedoop input device (e.g., a Sony VAIO PictureBook laptop with built-in camera), the operating system's registry database can be employed to associate different application programs with different CLASS/DNS IDs (just as the .XLS and .DOC file extensions are commonly associated by existing operating system registries to invoke Microsoft Excel and Word software applications, respectively). When a new Bedoop application is installed, it logs an entry in the registry database indicating the CLASS/DNS ID(s) that it will handle. Thereafter, when an object with such a CLASS/DNS ID is encountered, the operating system automatically launches the corresponding application to service the Bedoop data in an appropriate manner.

Sometimes the computer system may encounter a Bedoop object for which it does not have a registered application program. In such case, a default Bedoop application can be invoked. This default application can, e.g., establish an internet link to a remote server computer (or a network of such computers), and can transmit the Bedoop data (or a part of the Bedoop data) to that remote computer. The remote server can undertake the response itself, it can instruct the originating computer how to respond appropriately, or it can undertake some combination of these two responses. (Such arrangements are further considered below.)

Figure 2:
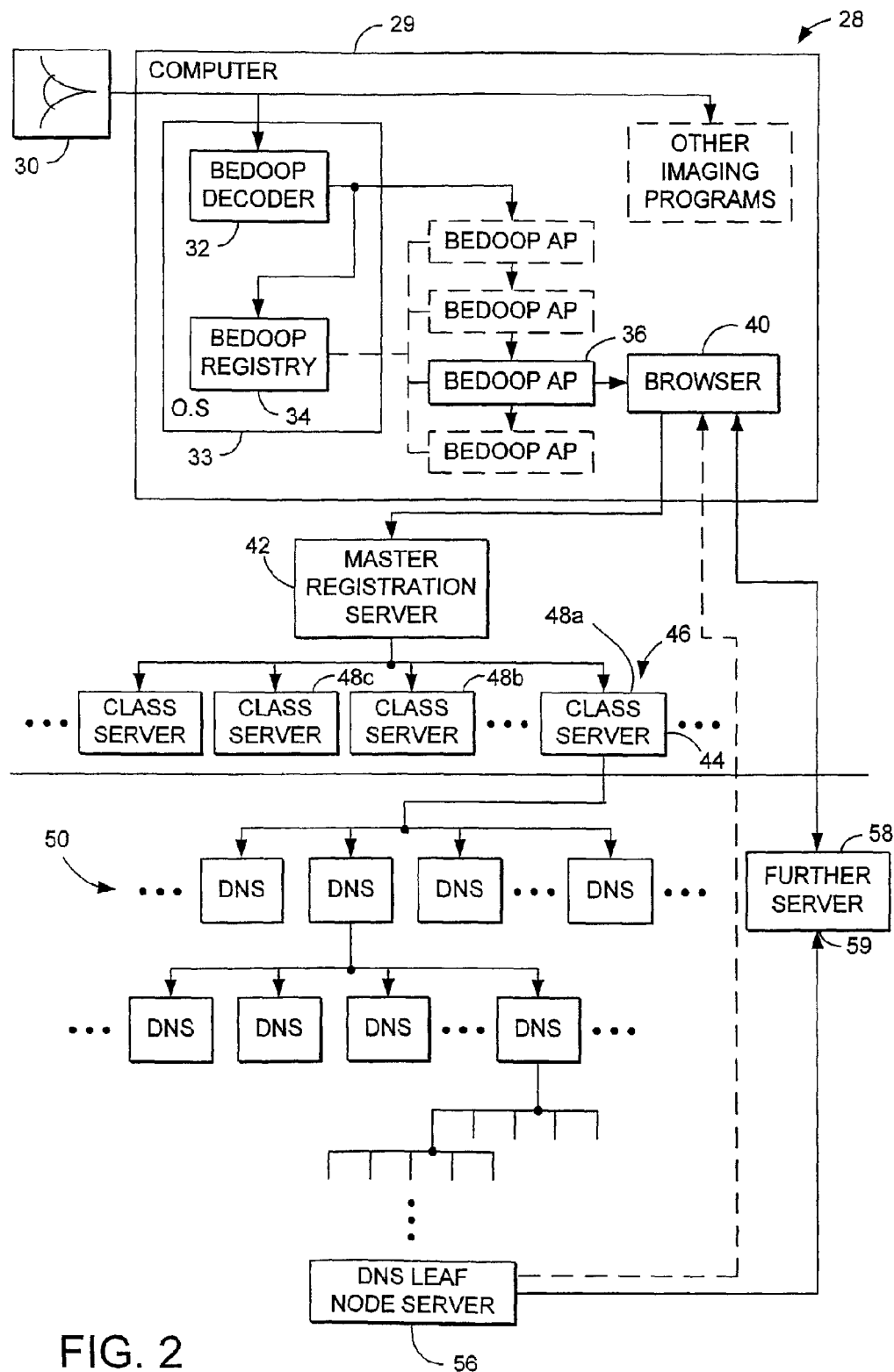
FIG. 2 is another block diagram showing an embodiment of an arrangement detailed herein.

FIG. 2 shows an illustrative architecture employing the foregoing arrangement.

At a local Bedoop system 28 (which may be implemented, for example, using a conventional personal computer 29), a camera, scanner, or other optical sensor 30 provides image data to a decoder 32 (which may be implemented as a software component of the operating system 33). The decoder 32 analyzes the image data to discern the plural-bit Bedoop data. The CLASS ID of this Bedoop data is applied to a Bedoop registry 34. The registry responds by identifying and launching a local Bedoop application 36 designed to service the discerned Bedoop data.

Sometimes the system 28 may encounter a Bedoop object for which several different responses may be appropriate. In the case of a printed office document, for example, one response may be as described above—to present the electronic version of the file on a computer, ready for editing. But other responses may also be desired, such as writing an email message to the author of the printed document, with the author's email address already specified in the message address field, etc.

Such different responses may be handled by different Bedoop applications, or may be options that are both provided by a single Bedoop application. In the former case, when the CLASS/DNS IDs are decoded and provided to the operating system, the registry indicates that there are two (or more) programs that might be invoked. The operating system can then present a dialog box to the user inviting the user to specify which form of response is desired. Optionally, a default choice can be made if the user doesn't specify within a brief period (e.g., three seconds). The operating system can then launch the Bedoop application corresponding to the chosen response.

A similar arrangement can be employed if a single Bedoop application can provide both responses. In such case the operating system launches the single Bedoop application (since there is no ambiguity to be resolved), and the application presents the choice to the user. Again, the user can select, or a default choice can be automatically made.

In the just-described situations, the user can effect the choice by using the keyboard or mouse—as with traditional dialog boxes. But Bedoop provides another, usually easier, form of interaction. The user can make the selection through the optical sensor input. For example, moving the object to the right can cause a UI button on the right side of the dialog box to be selected; moving the object to the left can cause a UI button on the left side of the dialog box to be selected; moving the object towards the camera can cause the selected button to be activated. Many other such techniques are possible, as discussed below.

If the registry 34 does not recognize, or otherwise does not know how to respond to Bedoop data of that particular CLASS/DNS, the registry launches a default Bedoop client application. This client application, in turn, directs a web browser 40 on the local Bedoop system 28 to communicate with a remote master registration server computer 42. The local computer forwards the Bedoop data to this master server. The master server 42 examines the CLASS ID, and forwards the Bedoop data (directly, or through intervening servers) to a corresponding CLASS server 44. (A single server may handle Bedoop data of several classes, but more typically there is a dedicated server for each CLASS.)

Each CLASS server 44 serves as the root of a tree 46 of distributed DNS servers. A DNS server 48a, for example, in a first tier 50 of the DNS server tree, may handle Bedoop data having DNS IDs beginning with "000." Likewise, DNS server 48b may handle Bedoop data having DNS IDs beginning with "001," etc., etc.

Each DNS server in the first tier 50 may, in turn, route Bedoop data to one of 8 servers in a second tier of the tree, in accordance with the fourth-through sixth bits of the DNS data. The tree continues in this fashion until a terminal level of DNS leaf node servers 56.

Ultimately, Bedoop data routed into this network reaches a DNS leaf node server 56. That leaf node server may handle the Bedoop data, or may redirect the local Bedoop system to a further server 58 that does so. That ultimate server— whether a DNS leaf node server or a further server—can query the local Bedoop system for further information, if necessary, and can either instruct the local Bedoop system how to respond, or can undertake some or all of the response itself and simply relay appropriate data back to the local Bedoop system.

In arrangements in which the local Bedoop system is redirected, by the DNS leaf node server, to a further server that actually handles the response, access to the further server may be through a port 59 (e.g., a special URL) tailored to receipt of Bedoop data.

In a typical implementation, most or all of the servers are mirrored, or otherwise replicated/redundant, so that failure of individual computers does not impair operation of the system.

Caching can be provided throughout the trees of servers to speed responses. That is, responses by leaf nodes for certainly commonly-encountered CLASS/DNS IDs can be temporarily stored earlier in the tree(s). Bedoop data, propagating through the server network, can prompt a response from an intermediate server if there is a cache hit.

If desired, Bedoop traffic through the above-detailed server trees can be monitored to collect demographic and statistical information as to what systems are sending what Bedoop data, etc. One use of such information is to dynamically reconfigure the DNS network to better balance server loads, to virtually relocate DNS resources nearer regions of heavy usage, etc. Another use of such information is for marketing purposes, e.g., to promote certain Bedoop features and applications within user groups (e.g., internet domains) that seem to under-utilize those features.

Within certain user networks that are linked to the internet, e.g., corporate networks, Bedoop data that isn't handled within the originating Bedoop system may first be routed to a Bedoop name server within the corporate network. That server will recognize certain types of Bedoop data, and know of resources within the corporate network suitable for handling same. Referral to such resources within the corporate network will be made, where possible. These resources (e.g., corporate servers) may respond to Bedoop data in a way customized to the corporate preferences. If the corporate Bedoop name server does not know of a resource within the corporate network that can respond to the Bedoop data, the corporate name server then routes the data to the public Bedoop network described above. (Such referral can be to the master registration server or, to the extent the corporate name server knows the addresses of appropriate servers within the DNS server tree, or of the further servers to which DNS servers may point for certain Bedoop data, it can redirect the local Bedoop system accordingly.)

In typical rich Bedoop implementations, local systems may have libraries of Bedoop services, applications, or protocols. Some may be unique to that computer. Others may be commonly available on all computers. Some may be highly secure, employing encryption and/or anti-hacking measures, or data protocols that are not generally recognized. Others may be shareware, or the result of open-source programming efforts.

Greeting Cards, Birthday Cards, Etc.

In accordance with a further embodiment of the technology, greeting cards and the like are encoded (e.g., by texturing, printing, etc.) with Bedoop data. On receiving such a card, a recipient holds it in front of the image capture device on a laptop or other computer. The computer responds by displaying an internet web page that has a stock- or customized-presentation (image, video, audio-video, etc.) to complement that presented on the greeting card.

The web site presentation can be personalized by the sender (e.g., with a text message, recent family photographs, etc.), either at the point of card sale, or sometime after the card is purchased. In the latter case, for example, the card can be serialized. After taking the card home, the purchaser can visit the card vendor's web site and enter the card serial number in an appropriate user interface. The purchaser is then presented with a variety of simple editing tools to facilitate customization of the web greeting. When the sender is finished designing the web greeting, the finished web page data is stored (by software at the vendor's web site) at a site corresponding to the serial number.

When the card is received by a recipient and held in front of a Bedoop sensor, CLASS, DNS, and UID data is decoded from the card. The CLASS and DNS data are used to navigate the earlier-described server network to reach a corresponding DNS leaf node server (perhaps maintained by the Hallmark greeting card company). That leaf node server indexes a table, database, or other data structure with the UID from the Bedoop data, and obtains from that data structure the address of an ultimate web site—the same address at which the web greeting customized by the sender was stored. That address is provided by the DNS leaf node server back to the local computer, with instructions that the web page at that address be loaded and displayed (e.g., by HTML redirection). The local computer complies, presenting the customized web greeting to the card recipient.

In the just-described embodiment, in which a pre-encoded card is purchased by a sender and the web-display is then customized, the address of the web site is typically determined by the card vendor. But this need not be the case. Likewise, the card need not be "purchased" in the typical, card-shop fashion.

To illustrate the foregoing alternatives, consider the on-line acquisition of a greeting card, e.g., by visiting a web site specializing in greeting cards. With suitable user-selection (and, optionally, customization), the desired card can be printed using an ink-jet or other printer at the sender's home. In such case, the Bedoop data on the card can be similarly customized. Instead of leading to a site determined by the card vendor, the data can lead to the sender's personal web page, or to another arbitrary web address.

To effect such an arrangement, the sender must arrange for a DNS leaf node server to respond to a particular set of Bedoop data by pointing to the desired web page. While individuals typically will not own DNS servers, internet service providers commonly will. Just as AOL provides simple tools permitting its subscribers to manage their own modest web pages, internet service providers can likewise provide simple tools permitting subscribers to make use of DNS leaf node servers. Each subscriber may be assigned up to 20 UIDs (under a particular CLASS and DNS). The tools would permit the users to define a corresponding web address for each UID. Whenever a Bedoop application led to that DNS leaf node server, and presented one of those UIDs, the server would instruct the originating computer to load and present the web page at the corresponding web address 58.

Prior to customizing the greeting card, the sender uses the tool provided by the internet service provider to store the address of a desired destination web address in correspondence with one of the sender's available UIDs. When customizing the greeting card, the sender specifies the Bedoop data that is to be encoded, including the just-referenced UID. The greeting card application encodes this data into the artwork and prints the resulting card. When this card is later presented to a Bedoop system by the recipient, the recipient's system loads and displays the web page specified by the sender.

Commerce in Bedoop Resources

In the just-described arrangement, internet service providers make available to each subscriber a limited number of UIDs on a DNS server maintained by the service. Business enterprises typically need greater Bedoop resources, such as their own DNS IDs (or even their own CLASS ID(s).

While variants of the Bedoop system are extensible to provide an essentially unlimited number of CLASS IDs and DNS IDs, in the illustrated system these resources are limited. Public service, non-profit, and academic applications should have relatively generous access to Bedoop resources, either without charge or for only a modest charge. Business enterprises, in contrast, would be expected to pay fees to moderate their potentially insatiable demand for the resources. Small businesses could lease blocks of UIDs under a given CLASS/DNS ID. Larger businesses could acquire rights to entire DNS IDs, or to entire CLASS IDs (at commensurately greater fees).

Web-based systems for assigning DNS IDs (and CLASS IDs) can be modeled after those successfully used by Internic.com, and now Networksolutions.com, for registration of internet domains. The user fills out a web-based form with names, addresses, and billing information; the system makes the necessary changes to all of the hidden system infrastructure—updating databases, routing tables, etc., in servers around the world.

Controlled-Access ID

Just as the above-described embodiment employed an ink-jet printer to produce a customized-Bedoop greeting card, the same principles can likewise be applied to access-control objects, such as photo-IDs.

Consider an employment candidate who will be interviewing at a new employer. The candidate's visit is expected, but she is not recognized by the building's security personnel. In this, and many other applications, arrangements like the following can be used:

The employer e-mails or otherwise sends the candidate an access code. (The code can be encrypted for transmission.) The code is valid only for a certain time period on a given date (e.g., 9:00 a.m.-11:00 a.m. on Jun. 29, 1999).

Upon receipt of the access code, the candidate downloads from the web site of the state Department of Motor Vehicles the latest copy of her driver's license photo. The DMV has already encoded this photo with Bedoop data. This data leads to a state-run DNS leaf node server 56. When that server is presented with a UID decoded from a photograph, the server accesses a database and returns to the inquiring computer a text string indicating the name of the person depicted by the photograph.

The candidate incorporates this photo into an access badge. Using a software application (which may be provided especially for such purposes, e.g., as part of an office productivity suite), the photo is dragged into an access badge template. The access code emailed from the employer is also provided to this application. On selecting "Print," an ink-jet printer associated with the candidate's computer prints out an access badge that includes her DMV photo and her name, and is also steganographically encoded in accordance with the employer-provided access code.

The name printed on the badge is obtained (by the candidate's computer) from the DMV's DNS server, in response to Bedoop data extracted from the photograph. (In this application, unlike most, the photograph is not scanned as part of a Bedoop process. Instead, the photograph is already available in digital form, so the Bedoop decoding proceeds directly from the digital representation.)

For security purposes, the access code is not embedded using standard Bedoop techniques. Instead, a non-standard format (typically steganographic) is employed. The embedding of this access code can span the entire face of the card, or can be limited to certain regions (e.g., excluding the region occupied by the photograph).

On the appointed day the candidate presents herself at the employer's building. At the exterior door lock, the candidate presents the badge to an optical sensor device, which reads the embedded building access code, checks it for authenticity and, if the candidate arrived within the permitted hours, unlocks the door.

Inside the building the candidate may encounter a security guard. Seeing an unfamiliar person, the guard may visually compare the photo on the badge with the candidate's face. Additionally, the guard can present the badge to a portable Bedoop device, or to one of many Bedoop systems scattered through the building (e.g., at every telephone). The Bedoop system extracts the Bedoop data from the card (i.e., from the DMV photograph), interrogates the DMV's DNS server with this Bedoop data, and receives in reply the name of the person depicted in the photograph. (If the Bedoop system is a telephone, the name may be displayed on a small LCD display commonly provided on telephones.)

The guard checks the name returned by the Bedoop system with the name printed on the badge. On seeing that the printed and Bedoop-decoded names match (and optionally checking the door log to see that a person of that name was authorized to enter and did so), the security guard can let the candidate pass.

It will be recognized that the just-described arrangement offers very high security, yet this security is achieved without the candidate ever previously visiting the employer, without the employer knowing what the candidate looks like, and by use of an access badge produced by the candidate herself.

Variants of such home-printed badge embodiments find numerous applications. Consider purchasing movie- or event-tickets over the web. The user can print an access ticket that has an entry code embedded therein. On arriving at the theater or event, the user presents the ticket to an optical scanning device, which decodes the entry code, checks the validity of same, authorizes the entry, and marks that entry code as having been used (preventing multiple uses of tickets printed with the same code).

Ink-Jet Printing

In the foregoing discussions, reference has been made to use of ink-jet printing as a means for providing steganographically encoded indicia on substrates. The following discussion expands on some of the operative principles.

The basic physics and very low level analog electronic operation of ink-jet printers (sometimes termed bubble jet printers) are ideally suited to support very-light-tint background digital watermarking on any form of substrate. (Watermarking through apparent "tinting" of substrates is discussed in U.S. Pat. No. 6,345,104.) In general, the statement, "if you can print it with an ink jet printer, you can watermark it" is largely accurate, even for (perhaps especially for) simple text documents. Indeed, there is a degree of flexibility and control in the ink-jet printing realm that is not as generally available in more traditional printing technologies, such as commercial offset printing and other plate-based technologies. (This is not to say that ink-jet has better quality than plate-based technologies; it has more to do with the statistics of ink droplets than anything else.) Heavier tint backgrounds are possible as well, where the continuum ranges from very light background tinting, where the casual observer will see "white paper," all the way through heavily inked patterned backgrounds, and photographs themselves, and everything in between.

In some embodiments, the ink-jet driver software is modified to provide lower-level control of individual droplet emission than is provided in existing printer drivers, which are naturally optimized for text and graphics. In some such embodiments, the "watermarking" print mode is another option from which the user can select (e.g., in addition to High Quality, Econo-Fast, etc.), or the selection can be made automatically by application software that is printing watermarked data.

In more sophisticated embodiments, the watermark data is applied to the printer driver software independently of the other image/text data. The printer driver is arranged to eject droplets in the usual print density for the image/text data, and at a more accurately-controlled, finer density for the separately-applied watermark data. (The latter may be effected as a slight modulation signal on the former.) This arrangement provides for essentially transparent integration into existing printer environments—no one need worry about the watermarking capability except the software applications that specifically make use of same.

Consumer Marking of Web-Based Materials

Various items of printed media can originate off the web, yet be printed at home. Examples include movie tickets, coupons, car brochures, etc. Bedoop data can be added, or modified, by the software application or by the printer driver at the time of printing. (Alternatively, the Bedoop data can be customized to correspond to the user before being downloaded to the user's system for printing.)

One advantage to Bedoop-encoding printed images locally, as opposed to Bedoop-encoding the image files prior to downloading for local printing, is that the encoding can be tailored in accordance with the particular properties of the local printer (e.g., to increase robustness or decrease visibility)—properties not generally known to a remote server.

In one particular example, the UID field in the Bedoop data can be written with a value that serves as an index to a database of user profiles, permitting later systems to which the printed item is presented to personalize their response in accordance with the profile data.

In another example, the UID field serves an authentication purpose, e.g., to verify that the printed medium actually was printed at a particular place, or by a particular user or at a particular time.

Coffee Mug

At retail coffee outlets, customers commonly order the same drink day after day ("half-decaf, short, skinny latte"). Some customers present personal coffee mugs to the cashier, preferring the sensation of ceramic or metal to paper, and avoiding the trash/recycle dilemma.

The drinker's "regular" order can be Bedoop-encoded either on the mug itself or, more commonly, on an adhesive label applied to the mug. The encoding can be in addition to other aesthetic imagery (e.g., artwork or a photo), or the marking can be purely data. Labels the size of postage stamps may be used.

On handing the mug to the cashier, the customer can simply say "the regular." The cashier passes the mug in front of the optical scanning device of a Bedoop system associated with the cash register. The system steganographically decodes the data and provides the corresponding order ("half-decaf, short, skinny latte"), either textually or audibly (e.g., by a voice synthesizer) to the cashier or the barrista. The cash register system also knows the current price of the requested drink, and rings up the charge accordingly.

Labels of the type described can be available to the cashier on pre-printed rolls, just as with other adhesive stickers, or can be printed on-demand. (Small label printers may be best suited in the latter case, given space constraints in retail outlets.) Customers ordering drinks for personal mugs may be invited to take a label corresponding to their just-ordered drink and apply it to their mug for future use.

In variants on this basic theme, the mug label can be further encoded (or a supplemental label can be provided and encoded) with electronic payment information, such as the customer's credit card number, or the number of a debit account maintained by the coffee merchant for that customer. When the mug is scanned for the drink order, the system likewise detects the payment information and charges the corresponding fee to the appropriate account. (For security reasons, the system may be arranged so that the mug cannot be used to authorize more than, say $5 of coffee drink purchases per day.)

In another variant on this theme, the system maintains an electronic log of coffee purchases made by the customer and, in accordance with then-prevailing marketing considerations, rewards the customer with a free drink after 8 or 12, etc., drinks have been purchased.

In still another variant on this theme, regular customers who use Bedoop-labeled mugs can participate in periodic promotions in which, for example, every $N^{th}$ such customer is rewarded with a cash or merchandise prize. Bells go off when the $N^{th}$ mug is scanned. (N can be a fixed number, such as 500, or can be a random number—typically within a known range or with a known mean.)

Smart Elevators

In accordance with another embodiment of the technology, a building elevator is provided with one or more optical capture devices. Each device examines monitors the contents of the elevator chamber looking for Bedoop encoded objects, such as ID badges.

On sensing a Bedoop-encoded object, the elevator can determine—among other data—the floor on which the wearer's office is located. The system can then automatically direct the elevator to that floor, without the need for the person to operate any buttons. (The elevator's button panel can be provided with a new, override button that can be operated to un-select the most recently selected floor(s), e.g., in case a user wants to travel to a different floor.)

To aid in identification, the Bedoop objects (e.g., badges) can be colored a distinctive color, permitting the system to more easily identify candidate objects from other items within the optical capture devices' field of view. Or the object can be provided with a retro-reflective coating, and the elevator can be equipped with one or more illumination sources of known spectral or temporal quality (e.g., constant infra red, or constant illumination with a single- or multi-line spectrum, or a pulsed light source of known periodicity; LEDs or semiconductor lasers, each with an associated diffuser, can be used for each the foregoing and can be paired with the image capture devices). Other such tell-tale clues can likewise be used to aid in object location. In all such cases, the optical capture device can sense the tell-tale clue(s) using a wide field of view sensor. The device can then be physically or electronically steered, and/or zoomed, to acquire a higher resolution image of the digitally-encoded object suitable for decoding.

Magazines

Magazine (and newspaper) pages can be steganographically encoded with Bedoop data to provide another "paper as portal" experience. As with the earlier described office document case, the encoded data yields an address to a computer location (e.g., a web page) having the same, or related, content.

In one exemplary embodiment, the blank magazine page stock is Bedoop-encoded prior to printing. The watermarking can be performed by high speed ink-jet devices, which splatter a fine pattern of essentially imperceptible ink droplets across each page. Each page can be differently watermarked so that, on decoding, page 21 of a magazine can be distinguished from page 22 of the same magazine (and page 106 of the Jun. 21, 1999, issue can be distinguished from page 106 of the Jun. 28, 1999, issue). If desired, each page can be further segregated into regions—either in accordance with the actual boundaries of articles that will later be printed on the pages, or in a grid pattern, e.g., of 3 columns across by 5 rows high. Each region conveys a distinct Bedoop code, permitting different portions of the page to lead to different web data.)

After watermarking and printing, the pages thus produced are bound in the usual fashion with others to form the finished magazine. (Not all pages in the magazine need to be watermarked.)

Of course, the watermarking can be effected by processes other than ink-jet printing. For example, texturing by pressure rollers is another option well suited for the large volumes of paper to be processed.

On presenting a magazine to the optical scanner device of a Bedoop-compliant computer, the computer senses the Bedoop data, decodes same, and launches a web browser to an internet address corresponding to the Bedoop data. If the magazine page is an advertisement, the internet address can provide information complementary to the advertisement. For example, if the magazine page is an advertisement for a grocery item, the Bedoop data can identify a web page on which recipes using the advertised item are presented. If the magazine page includes a photo of a tropical beach, the Bedoop data can lead to a travel web page (e.g., hosted by Expedia or other travel service) that presents fare and lodging information useful to a reader who wants to vacation at the illustrated beach. (The fare information can be customized to the reader's home airport by reference to user profile data stored on the user's computer and relayed to the web site to permit customization of the displayed page.)

The data to which the Bedoop data leads needn't be static; it can be updated on a weekly, daily, or other basis. Thus, if a months-old magazine page is presented to a Bedoop device, the resultant data can be up-to-the-minute.

In the case of advertising, the inclusion of Bedoop data increases the value of the ad to the advertiser, and so merits a higher charge to the advertiser from the magazine publisher. This higher charge may be shared with the enterprise(s) that provides the Bedoop technology and infrastructure through which the higher value is achieved.

Business Card Applications

Conventional business cards can be steganographically encoded with Bedoop data, e.g., by texturing, watermark tinting, ink-jet splattering, text steganography, etc. As with many of the earlier-described embodiments, the steganographic encoding is tailored to facilitate decoding in the presence of arbitrary rotation or scale distortion of the card introduced during scanning (Some such techniques are shown, e.g., in applicant's related patents identified above. Various other techniques are known to artisans.)

When a recipient of a business card holds it in front of a Bedoop sensor, the operating system on the local system launches a local Bedoop application. That local Bedoop application, in turn, establishes an external internet connection to a remote business card server. The address of that server may already be known to the local Bedoop application (e.g., having been stored from previous use), or the local Bedoop system can traverse the above-described public network of DNS servers to reach the business card server.

A database on the business card name server maintains a large collection of business card data, one database record per UID. When that server receives Bedoop data from a local Bedoop system, it parses out the UID and accesses the corresponding database record. This record typically includes more information than is commonly printed on conventional business cards. Sample fields from the record may include, for example, name, title, office phone, office fax, home phone, home fax, cellular phone, email address, company name, corporate web page address, personal web page address, secretary's name, spouse's name, and birthday. This record is transmitted back to the originating Bedoop system.

The local Bedoop system now has the data, but needs further instruction from the user as to how it should be processed. Should a telephone number be dialed? Should the information be entered into a personal contact manager database (e.g., Outlook) on the local system? Etc.

In an exemplary embodiment, the local system presents the available choices to the user, e.g., by textual prompts, synthesized voice, etc. The user responds by manipulating the business card in a manner prompted by the system (e.g., move down to telephone at office; move up to telephone at home; move right to access corporate web page; move left to access personal web page; rotate left to enter certain elements from the database record (filtered in accordance with a template) into personal contact manager database, etc. The local Bedoop system responds accordingly.

Some card givers may choose to make additional information available to card recipients—information beyond that known in prior art contact-management software applications. For example, one of the choices presented by a local Bedoop system in response to presentation of a business card may be to review the card-giver's personal calendar. (The card-giver can maintain his or her personal calendar on a web-accessible computer.) By such arrangement, the card-recipient can learn when the card-giver may be found in the office, when appointments might be scheduled, etc., etc.

Typically, access to this web-calendar is not available to casual web browsers, but is accessible only in response to Bedoop data (which may thus be regarded as a form of authentication or password data).

Some users may carry several differently-encoded cards, each with a different level of access authorization (e.g., with different UIDs). Thus, some cards may access a biographical page without any calendar information, other cards may access the same or different page with access enabled to today's calendar, or this week's calendar, only, and still other cards (e.g., the "spouse" card) may access the same or different page with access enabled for the card-giver's complete calendar. The user can distribute these different cards to different persons in accordance with the amount of personal information desired to be shared with each.

In accordance with a related embodiment, the database record corresponding to Bedoop business card data can include a "now" telephone number field. This field can be continually-updated throughout the day with the then-most-suitable communications channel to the card-giver. When the card-giver leaves home to go to the office, or leaves the office for a trip in the car, or works a week at a corporate office in another town, etc., this data field can be updated accordingly. (A pocket GPS receiver, with a wireless uplink, can be carried by the person to aid in switching the "now" number among various known possibilities depending on the person's instantaneous position.) When this database record is polled for the "now" number, it provides the then-current information.

Consider a Bedoop-enabled public telephone. To dial the phone, a business card is held in front of the Bedoop sensor (or slid through an optical scanner track). The phone interrogates the database at the business card server for the "now" number and dials that number.

To update the any of the fields stored in the database record, the card giver can use a special card that provides write-authorization privileges. This special card can be a specially encoded version of the business card, or can be another object unique to the card-giver (e.g., the card-giver's driver's license).

The reference to business cards and personal calendars is illustrative only. Going back a century, "calling cards" were used by persons whose interests were strictly social, rather than business. The just-discussed principles can be similarly applied. Teenagers can carry small cards to exchange with new acquaintances to grant access to private dossiers of personal information, favorite music, artwork, video clips, etc. The cards can be decorated with art or other indicia that can serve purposes wholly unrelated to the Bedoop data steganographically encoded therein.

Gestural Input

A Bedoop system can determine the scale state, rotation state, X-Y offset, and differential scale state, of an object by reference to embedded calibration data, or other techniques. If the scan device operates at a suitably high frame rate (e.g., five or ten frames per second), change(s) in any or all of these four variables can be tracked over time, and can serve as additional input.

In an earlier-discussed example, moving an object to the left or right in front of the Bedoop scanner caused a left- or right-positioned button in a dialog box to be selected. This is a change in the X-Y offset of the scanned object. In that earlier example, moving the object inwardly towards the camera caused the selected button to be activated. This is a change in the scale state of the scanned object.

In similar fashion, twisting the object to the left or right can prompt one of two further responses in a suitably programmed Bedoop application. (This is a change in the rotation state.) Likewise, tilting the object so that one part is moved towards or away from the camera can prompt one of two further responses in the application. (This is a change in the differential scale state.)

In the business card case just-discussed, for example, the card can be held in front of the Bedoop scanner of a computer. If the card is twisted to the left, the computer opens a web browser to a web page address corresponding to Bedoop data on the card. If the card is twisted to the right, the computer opens an e-mail template, pre-addressed to an e-mail address indicated by the card.

In other examples, twisting an object to move the right edge towards the scanner can be used to effect a right mouse click input, and twisting the object to move the right edge away from the scanner can be used to effect a left mouse click input.

Simultaneous changes in two of these four positioning variables can be used to provide one of four different inputs to the computer (e.g., (a) twisting left while moving in; (b) twisting left while moving out; (c) twisting right while moving in; and (d) twisting right while moving out). Simultaneous changes to three or all four of these variables can similarly be used to provide one of eight or sixteen different inputs to the computer.

Simultaneous manipulations of the object in two or more of these modes is generally unwieldy, and loses the simple, intuitive, feel that characterizes manipulation of the object in one mode. However, a similar effect can be achieved by sequential, rather than simultaneous, manipulation of the card in different modes (e.g., twist left, then move in). Moreover, sequential manipulations permit the same mode to be used twice in succession (e.g., move in, then move out). By such sequential manipulations of the object, arbitrarily complex input can be conveyed to the Bedoop system.

It will be recognized that a digitally-encoded object is not necessary to the gestural-input applications described above. Any object (talisman) that can be distinguished in the image data can be manipulated by a user in the manners described above, and an appropriate system can recognize the movement of the object and respond accordingly. The provision of digital data on the object provides a further dimension of functionality (e.g., permitting the same gesture to mean different things, depending on the digital encoding of the object being manipulated), but this is not essential.

Moreover, even within the realm of digitally-encoded gestural talismans, steganographic encoding is not essential. Any other known form of optically-recognizable digital encoding (e.g., 1D and 2D bar codes, etc.) can readily be employed.

In an illustrative embodiment, a business card or photograph is used as the talisman, but the range of possible talismans is essentially unlimited.

Gestural Decoding Module

There are various ways in which the Bedoop system's decoding of gestural input can be effected. In some Bedoop systems, this functionality is provided as part of the Bedoop applications. Generally, however, the applications must be provided with the raw frame data in order to discern the gestural movements. Since this functionality is typically utilized by many Bedoop applications, it is generally preferable to provide a single set of gestural interpretation software functions (commonly at the operating system level) to analyze the frame data, and make available gestural output data in standardized form to all Bedoop applications.

In one such system, a gestural decoding module tracks the encoded object within the series of image data frames, and outputs various parameters characterizing the object's position and manipulation over time. Two of these parameters indicate the X-Y position of the object within current frame of image data. The module can identify a reference point (or several) on the object, and output two corresponding position data (X and Y). The first represents the horizontal offset of the reference point from the center of the image frame, represented as a percentage of frame width. A two's complement representation, or other representation capable of expressing both positive and negative values, can be used so that this parameter has a positive value if the reference point is right of center-frame, and has a negative value if the reference point is left of center frame. The second parameter, Y, similarly characterizes the position of the reference point above or below center-frame (with above-being represented by a positive value). Each of these two parameters can be expressed as a seven-bit byte. A new pair of X, Y parameters is output from the gestural decoding module each time a new frame of image data is processed.

In many applications, the absolute X-Y position of the object is not important. Rather, it is the movement of the object in X and Y from frame-to-frame that controls some aspect of the system's response. The Bedoop application can monitor the change in the two above-described parameters, frame to frame, to discern such movement. More commonly, however, the gestural decoding module performs this function and outputs two further parameters, X' and Y'. The former indicates the movement of the reference point in right/left directions since the last image frame, as a percentage of the full-frame width. Again, this parameter is represented in two's complement form, with positive values representing movement in the rightward direction, and negative values representing movement in the leftward direction. The later parameter similarly indicates the movement of the reference point in up/down directions since the last frame.

The scale, differential scale, and rotation states of the object can be similarly analyzed and represented by parameters output from the gestural decoding module.

Scale state can be discerned by reference to two (or more) reference points on the object (e.g., diagonal corners of a card). The distance between the two points (or the area circumscribed by three or more points) is discerned, and expressed as a percentage of the diagonal size of the image frame (or its area). A single output parameter, A, which may be a seven-bit binary representation, is output.

As with X-Y data, the gestural decoding module can likewise monitor changes in the scale state parameter since the last frame, and product a corresponding output parameter A'. This parameter can be expressed in two's complement form, with positive values indicating movement of the object towards the sensor since the last frame, and negative values indicating movement away.

A differential scale parameter, B, can be discerned by reference to four reference points on the object (e.g., center points on the four edges of a card). The two points on the side edges of the card define a horizontal line; the two points on the top and bottom edges of the card define a vertical line. The ratio of the two line lengths is a measure of differential scale. This ratio can be expressed as the shorter line's length as a percentage of the longer line's length (i.e., the ratio is always between zero and one). Again, a two's complement seven-bit representation can be used, with positive values indicating that the vertical line is shorter, and negative values indicating that the horizontal line is shorter. (As before, a dynamic parameter B' can also be discerned to express the change in the differential scale parameter B since the last frame, again in two's complement, seven bit form.)

A rotation state parameter C can be discerned by the angular orientation of a line defined by two reference points on the object (e.g., center points on the two side edges of a card). This parameter can be encoded as a seven-bit binary value representing the percentage of rotational offset in a clockwise direction from a reference orientation (e.g., horizontal). (The two reference points must be distinguishable from each other regardless of angular position of the object, if data in the full range of 0-360 degrees is to be represented. If these two points are not distinguishable, it may only be possible to represent data in the range of 0-180 degrees.) As before, a dynamic parameter C' can also be discerned to express the change in the rotation state parameter C since the last frame. This parameter can be in seven bit, two's complement form, with positive values indicating change in a clockwise rotation The foregoing analysis techniques, and representation metrics, are of course illustrative only. The artisan will recognize many other arrangements that can meet the needs of the particular Bedoop applications being served.

In the illustrative system, the Bedoop application programs communicate with the gestural decoding module through a standardized set of interface protocols, such as APIs. One API can query the gestural input module for some or all of the current position parameters (e.g., any or all of X, Y, A, B, and C). The module responds to the calling application with the requested parameter(s). Another API can query the gestural input module for some or all of the current movement data (e.g., any or all of X', Y', A', B' and C'). Still another API can request the gestural decoding module to provide updated values for some or all of the position or movement data on a running basis, as soon as they are discerned from each frame. A complementary API discontinues the foregoing operation. By such arrangement, all of the gestural data is available, but the Bedoop application programs only obtain the particular data they need, and only when they ask for it.

In Bedoop applications that communicate with external servers, just the Bedoop data (i.e., CLASS, DNS, and optionally UID) may initially be sent. If the remote server needs to consider gestural data in deciding how to respond, the remote server can poll the local Bedoop system for the necessary data. The requested gestural data is then sent by the local Bedoop system to the remote server in one or more separate transmissions.

In other embodiments, since the gestural data is of such low bandwidth (e.g., roughly 56 bits per image frame), it may routinely and automatically be sent to the remote computer, so that the gesture data is immediately available in case it is needed. In an illustrative implementation, this data is assembled into an 8-byte packet, with the first byte of the packet (e.g., the X parameter) being prefixed with a "1" sync bit, and subsequent bytes of the packet being prefixed with "0" sync bits. (The sync bits can be used to aid in accurate packet decoding.)

In some embodiments, it is useful to provide for an extension to the normal 64-bit Bedoop length to accommodate an associated packet of gestural data. This can be effected by use of a reserved bit, e.g., in the UID field of the Bedoop packet. This bit normally has a "0" value. If it has a "1" value, that indicates that the Bedoop data isn't just the usual 64 bits, but instead is 128 bits, with the latter 64 bits comprising a packet of gestural data.

Similar extension protocols can be used to associate other ancillary data with Bedoop data. A different reserved bit in the UID field, for example, may signal that a further data field of 256 bits follows the Bedoop data—a data field that will be interpreted by the remote computer that ultimately services the Bedoop data in a known manner. (Such bits may convey, e.g., profile data, credit card data, etc.) The appended data field, in turn, may include one or more bits signaling the presence of still further appended data.

Grandmothers

It is a common complaint that computers are too complex for most people. Attempts to simplify computer-user interaction to facilitate use by less experienced users usually serve to frustrate more experienced users.

In accordance with another embodiment of the present technology, the sophistication of a computer user is steganographically indicated on a talisman used by that user to interact with the system. The computer detects this steganographically-encoded data, and alters its mode of interacting with the user accordingly.

Consider internet browser software. Experienced users are familiar with the different functionality that can be accessed, e.g., by various drop-down menus/sub-menus, by the keyboard shortcuts, by the menus available via right-clicking on the mouse, by manipulating the roller mouse scroll wheel and scroll button, etc., etc. Grandmothers of such users, typically, are not so familiar.

Although gestural interfaces hold great promise for simplifying user-computer interaction, the same dichotomy between experienced users and inexperienced users is likely to persist, frustrating one class of user or the other.

To help close this gap, a computer system according to this embodiment of the technology responds to gestures in different manners, depending on the expertise level indicated by encoding of the talisman. For an expert user, for example, the gestural interface active in the internet browser software may display the stored list of Favorite web addresses in response to tipping the left edge of the talisman towards the optical sensor. Once this list is displayed, the expert user may rotate the talisman to the right to cause the highlighting to scroll down the list from the top. Rotating the talisman to the left may scroll the list of Favorites up from the bottom. The speed of scrolling can be varied in accordance with the degree of rotation of the talisman from a default orientation.

In contrast, for the novice user, these talisman manipulations may be confounding rather than empowering. Tipping the left edge of the talisman towards the sensor may occur as often by mistake as on purpose. For such users, a more satisfactory interface may be provided by relying on simple X-Y movement of the talisman to move an on-screen cursor, with a movement of the talisman towards the sensor to serve as a selection signal (i.e., like a left-mouse click).

(In the example just-cited, the expert user summoned a list of Favorite web sites. Different "Favorites" lists can be maintained by the computer—each in association with different talismans. A husband who uses one talisman is provided a different "Favorites" list than a wife who uses a different talisman.)

Printed Pictures

In accordance with this aspect of the technology, a printed photograph can be steganographically encoded with Bedoop data leading to information relating to the depicted person (e.g., contact information, biographical information, etc.).

Such a photograph can be presented to a Bedoop sensor on a telephone. In a simple embodiment, the telephone simply processes the Bedoop data to obtain a corresponding default telephone number, and dials the number. In other embodiments, various options are possible, e.g., dial home number or dial work number. On presenting the photograph to the telephone, for example, moving the photo to the left may dial the person at home, while moving the photo to the right may dial the person at work.

As telephones evolve into more capable, multi-function devices, other manipulations can invoke other actions. In a computer/telephone hybrid device, for example, rotating the photo counterclockwise may launch a web browser to an address at which video data from a web cam at the pictured person's home is presented. Rotating the photo clockwise may present an e-mail form, pre-addressed to the e-mail address of the depicted person. Moving the photo to the right may query a database on the system for other photographs depicting the same individual or subject, which can be presented in response to further user input. Etc.

In this and other embodiments, it is helpful for the Bedoop device to prompt the user to aid in manipulating the object. This can be done audibly (e.g., "move photo left to dial at home") or by visual clues (e.g., presenting left- or right-pointing arrows).

Bedoop data in photographs can also be used to annotate the photographs, as with notes on the back of a photograph, or printed under the photograph in a photo album. The Bedoop data can lead to a remote database, where the photograph owner is permitted to enter a textual (or audio) narrative in association with each photograph's UID. Years later, when some of the names have been forgotten, the photograph can be positioned in front of a Bedoop sensor, and the system responds by providing the annotation provided by the photograph owner years earlier.

Drivers Licenses and Other Cards

Drivers licenses, social security cards, or other identity documents may be encoded by the issuing authority with Bedoop data that permits access to the holder's personal records over the web. On presenting the document to a Bedoop system, the system directs a web browser to a private address corresponding to data encoded on the document. At that address, the holder of the document can review governmental records, such as state or federal tax return data, social security entitlements, etc., as well as privately-maintained records, such as credit records, etc. User selection among various functions can be effected by spatial manipulation of the document. (Entry of additional data, such as social security number or mother's maiden name, may be required of the user to assure privacy in case the document is lost or stolen.)

By manipulating a driver's license in front of a Bedoop sensor, a user can request renewal of the driver's license, and authorize payment of the corresponding fee.

Bank cards (debit, credit, etc.) can similarly be encoded with Bedoop data to permit the holder to access bank records corresponding to the bank card account. (Entry of a PIN code may be required to assure privacy.)

Such documents can also be used to access other personal data. One example is e-mail. A traveler might pause at a Bedoop kiosk at an airport and present a driver's license. Without anything more, the kiosk may present email that is waiting for the traveler on an associated display screen.

On recognizing a driver's license, the kiosk can access a remote site (which may be maintained by the Department of Motor vehicles, another government entity, a private entity, or by the traveler), authenticating the operation by presenting Bedoop data encoded on the license, and obtaining information that the person has pre-approved for release in response to such authorized access. This information can include e-mail account and password information. Using this information, the kiosk queries the corresponding e-mail server, and downloads a copy of recently received mail for presentation at the kiosk. (A user-entered PIN number may be required at some point in the process, e.g., in querying the remote site for sensitive e-mail password data, before presenting the downloaded e-mail for viewing, etc., to ensure privacy.)

Other cards carried in wallets and purses can also be encoded to enable various functions. The local sandwich shop that rewards regular customers by awarding a free sandwich after a dozen have been purchased can encode their frequent-buyer card with Bedoop data leading to the shop's web-based sandwich delivery service. Or the frequent-buyer card can be eliminated, and customers can instead wave their business card or other identity document in front of the shop's Bedoop sensor to get purchase credit in a tally maintained by the sandwich shop's computer.

Food stamps, health insurance cards, and written medical prescriptions, can likewise be encoded with digital data to enable the provision of new functionality.

At large trade shows, such as COMDEX, vendors needn't publish thick, glossy brochures to hand out to visitors. Instead, they may print various stylish promo cards for distribution. When later presented to a Bedoop sensor, each card leads to a web-based presentation—optionally including persuasive video and other multi-media components. The user can be prompted to provide data to customize, or focus, the presentation to the user's particular requirements. If the user wants further information, a request can be made by the click of a mouse (or the twist of a card).

Prizes and Product Promotions

Product packaging (e.g., Coke cans, Snapple bottles, Pepsi 12-pack boxes) can be encoded for contest purposes. The encoding can be customized, item to item, so that selected items—when Bedoop scanned—are recognized to be the one in a hundred that entitles the owner to a cash or merchandise prize. A remote server to which the item's Bedoop data is provided queries the user for contact information (e.g., address, phone number) so the prize can be awarded or, for smaller prizes, the system can print out an award certificate redeemable at local merchants for products or cash. Once a winning item is identified to the remote server, its UID on the server is marked as redeemed so that the item cannot later be presented to win another prize.

In other such embodiments, all of the items are encoded identically. Winners are determined randomly. For example, during a contest period, persons around the world may present Coke cans to Bedoop systems. The corresponding Bedoop application on each user computer submits Bedoop data to a corresponding web address. The user's e-mail address may also be included with the submission. As this data is relayed to the corresponding server computer(s), every $N^{th}$ set of data is deemed to be a winner, and a corresponding award notification or prize is dispatched to the Bedoop system from which the winning set of data originated.

The server computer that receives such contest submittals from client Bedoop systems can be arranged to prevent a single user from bombarding the server with multiple sets of data in an attempt to win by brute force. (This may be done, for example, by checking the included e-mail address, and not considering a data submittal if the same e-mail address was encountered in data submitted within the past hour. Similar anti-brute-force protection can be provided on the user's computer, preventing, e.g., repeated contest data to be sent more frequently than once per hour. More sophisticated anti-brute-force measures can of course be provided.)

Product Information and Ordering

In accordance with another embodiment of the present technology, product packaging and product advertisements can be encoded with Bedoop data that, when presented to a Bedoop system, initiates a link to a web page from which that product can be purchased, or more information obtained. Once the link has been established, the user can be instructed to manipulate the object in different of the earlier-described modes to effect different functions, e.g., move towards camera to order the product; move away from camera for product information. If the object is moved towards the camera to effect an order, the user can be prompted to further manipulate the object to specify delivery options (e.g., rotate left for overnight mail, rotate right for regular mail). If the object is moved away from the camera to request product information, the user can be promoted to further manipulate the object to specify the type of information desired (e.g., rotate left for recipes, rotate right for FDA nutritional information, move up for information on other products in this family, move down to send an email to the product manufacturer).

Credit card or other customer billing information, together with mailing address information, can be stored in a profile on the Bedoop system, and relayed to the transactional web site either automatically when a purchase action is invoked, or after the user affirms that such information should be sent (which affirmation may be signaled by manipulation of the packaging or advertisement in one of the earlier-described modes). Other modes of payment can naturally be employed. (One such alternative is the first-to-redeem electronic money system described in the present assignee's patent application 60/134,782.)

Clothing

In accordance with another aspect of the technology, clothing can be ordered on-line by presenting to a Bedoop system a photograph from a catalog, or a garment tag or label. Encoded on each is product-identifying data, including a manufacturer ID. The Bedoop system responds by establishing a link to a remote computer maintained by or on behalf of the manufacturer. In addition to relaying the product identification data to the remote computer, the Bedoop application also sends some or all of a clothing profile maintained by the user on the local computer. This profile can specify, e.g., the person's weight, height, shoe size, waist size, inseam, etc. The remote computer can confirm availability of the identified item in the size specified in the clothing profile, and solicit payment and shipping instructions.

Computer Access Cards

This disclosure earlier considered access cards used to gain access to secure buildings. Related principles can be used in conjunction with computer access.

A driver's license, employee photo ID, or other such document can be presented to a Bedoop sensor on a computer. The computer recognizes the user and can take various steps in response.

One response is to log onto a network. Another is to set load a user profile file by which the computer knows how to arrange the desktop in the user's preferred manner. By manipulating the Bedoop-encoded object, the user can further vary the environment (e.g., rotate left to launch standard business productivity applications and software development applications; rotate left to launch lunchtime diversions— stock update, recreational games, etc.)

Hotel rooms are increasingly providing computer services. By presenting a driver's license, a Bedoop-equipped computer in a hotel room can link to a remote site indicated by the Bedoop data, obtain preference data for that user, and launch applications on the hotel computer in an arrangement that mimics that user's familiar work computer environment.

Audio/Video Disks, Software, and Books

Bedoop data can be conveyed by indicia or texturing on the surfaces of CD and DVD disks, on the labels (or authenticity certificates) for same, on the enclosures for same (e.g., jewel box, plastic case, etc.), on book dust jackets, on book pages, etc. Any of these objects can be presented to a Bedoop device to establish a link to a related web site. The consumer can then manipulate the object (or otherwise choose) to select different options.

For music, one option is to receive MP3 or other clips of songs by the same artist on other CDs, or of songs from other artists of the same genre. Another is to view music video clips featuring the same artist. Still another is to order tickets to upcoming concerts by that artist. In-store kiosks can permit tentative customers to listen to sample tracks before they buy.

Similar options can be presented for video DVDs. In the case of video, this can include listings of other movies with the same director, with the same star(s), etc. In the case of software, the options can include advisories, bug fixes, product updates and upgrades, etc. Naturally, the user can make purchases from these sites, e.g., of other music by the same artist, other videos with the same star, software upgrades, etc.

Similar options can be accessed using Bedoop data associated with printed book materials.

Ad Tracking

Advertisers commonly use different advertisements for the same product or service, and employ means to track which ad is more effective within which demographic group. Bedoop can provide such functionality.

Consider a travel service web site that is promoting Hawaiian vacations. Bedoop data from several advertisements can lead consumers to the site.

Identical advertisements can be placed in several different magazines. Each is encoded with a different Bedoop UID. By monitoring the UIDs of the Bedoop inquiries to the site, the travel service can determine which magazines yield the highest consumer response (e.g., per thousand readers).

Likewise, within a single magazine, two or more advertisements may be encoded with Bedoop data leading to the site— again, each with a different UID. Again, analysis of the UIDs used in accessing the site can indicate which advertisement was the more effective.

The instantaneous nature of the internet links permits advertisers to learn how consumer responses to print advertisements vary with time-of-day, yielding information that may assist in making ads for certain products more effective.

More elaborate variants and combinations of the foregoing are, of course, possible, If the consumers provide personal information in response to the ads (either by permitting access to pre-stored personal profile data, or by filling in web-based forms, or by manipulation of the ad (e.g., "please move the ad towards your Bedoop sensor if you drank coffee this morning")), still richer statistical data can be gleaned.

Rolodex of Cards

Bedoop-encoded business cards as detailed above can be accumulated and kept near a telephone or computer in a Rolodex-like arrangement. If a refrigerator ice-maker malfunctions, a homeowner can find the card for the appliance repairman used a few years ago, and present it to a Bedoop sensor. A link is established to the repairman's company (e.g., web site or via telephone). At a web site, the repairman may provide basic information, such as hours of availability, current fee schedule, etc. The homeowner may select an option (by card gesture or otherwise) to invoke a teleconference (e.g., NetMeeting) to consult about the problem. Or the homeowner may select another option to send e-mail. Still a further option may permit the homeowner to schedule a house call on the repairman's weekly calendar. Still a further option may permit the homeowner to view one or more short videos instructing customers how to fix certain common appliance problems.

Stored Value Cards

The earlier cited "first-to-redeem" electronic money system may encode Bedoop data on a card that leads to storage at which the random-number tokens (which represent increments of money) are stored. Presenting the card to a Bedoop system launches an application that reads and encrypts the tokens and forwards the encrypted data to the clearinghouse computer of the corresponding bank to learn their remaining value. There the tokens are decrypted and checked for validity (but not redeemed). The bank computer responds to the Bedoop system, indicating the remaining value of the tokens on the card.

For security reasons, the storage containing the random-number tokens should not be generally accessible. Instead, the user must provide authentication data indicating authorization to gain access to that information. This authentication data may be a PIN code. Or the user may provide authentication by presenting a second Bedoop-encoded object, e.g., a driver's license to the Bedoop system. (Many other Bedoop systems may advantageously use, or require the use of, two or more Bedoop objects—either presented one after the other, or all at the same time. The Bedoop system can provide visual or audible prompts leading the user to present the further Bedoop object(s) as necessary.

Ski Lift Tickets

In accordance with another embodiment, ski lift tickets are Bedoop encoded to provide various functionality.

For example, instead of buying a lift ticket good for a day, a skier may purchase a ticket good for eight lifts. This data is encoded on the ticket, and sensed by a Bedoop sensor at each lift. The sensors are networked to a common server that tracks the number of lifts actually purchased, and updates the number as used. The skier is informed of the number of rides remaining on entering or leaving the lift. Statistical data can be collected about trail usage (e.g., N % percent of skiers ski all day along just two lifts, etc.).

Off the slopes, back at home, the used lift ticket may be presented to a Bedoop sensor to obtain current snow conditions and lift hours, or to review trail maps, or to order ski vacation packages. If the ticket is encoded with the owner's name, UID, or other information of commercial/marketing interest, local merchants may give the bearer discounts on selected goods in response to Bedoop scanning of the ticket and recovery of such information.

REI Membership Cards

Membership cards for certain stores can be Bedoop-encoded to provide added value to the member. For outdoor gear stores such as REI, presentation of the card to a Bedoop sensor can lead to a library of USGS maps, to web pages with current fishing and hunting regulations, etc. Naturally, the store's on-line ordering site is just a quick twist away.

Theme Park Tickets

Theme park tickets can be encoded with the age and gender of the visitor, and with additional data permitting the experience to be customized (e.g., from a roster of theme park personalities, the visitor's favorite is Indiana Jones). Throughout the park are kiosks to which the visitor can present the ticket to orchestrate the visit to follow a particular story line. Some kiosks issue premiums matching the age/gender of the recipient.

Car Keys

In accordance with another embodiment of the technology, car keys (or key ring fobs) are Bedoop encoded. When the car is taken to a shop for service, the mechanic presents the key to a Bedoop sensor, and thereby obtains the car's maintenance history from a remote server on which it is maintained. At home, the key can be presented to a Bedoop sensor and manipulated to navigate through a variety of automotive-related web sites.

In some embodiments, the Bedoop-encoded object is not used to navigate to a site, but is instead used to provide data once a user's computer is otherwise linked to a web site. A user surfing the web who ends up at a car valuation site can present a key to the Bedoop scanner. The Bedoop data is used to access a remote database where the make, model, options, etc., of the car are stored. This data is provided to a database engine that returns to the user the estimated value of the car.

While visiting a mechanic's web site, presentation (and optionally manipulation) of a key or key ring fob can be employed to schedule a service appointment for the car.

Fashion Coordination

Some department stores and clothing retailers offer "personal shoppers" to perform various services. For example, a customer who is purchasing a dress may ask a personal shopper for assistance in selecting shoes or accessories that complement the dress.

A Bedoop-encoded garment tag on the dress can be employed to obtain similar assistance. In response to such a tag, a Bedoop system can query a database to obtain a mini-catalog of clothes and accessories that have previously been identified as complementing the dress identified by the tag. These items can be individually displayed on a screen associated with the system, or a virtual model wearing the dress—together with one or more of the recommended accessories—can be synthesized and depicted. The shopper may quickly review the look achieved by the model wearing the dress with various different pairs of shoes, etc., by repeatedly activating a user interface control (by mouse, touch screen, or garment tag gestures) to cycle through different combinations.

A shopper's credit card can be Bedoop-encoded so as to lead Bedoop systems of particular stores (i.e., stores pre-authorized by the shopper) to a profile on the shopper (e.g., containing size information, repeat purchase information, return history, style/color preferences, etc.).

Credit Card Purchases

When a consumer visits a commercial web site and wishes to purchase a displayed product, the transaction can be speeded simply by presenting a Bedoop-encoded credit card to a Bedoop sensor on the user's computer. The Bedoop data on the card leads to a database entry containing the credit card number and expiration date. The Bedoop application then sends this information (optionally after encrypting same) to the web site with instructions to purchase the depicted product.

(Impulse purchases are commonly deterred by the hurdles posed between the purchase impulse and the completed purchase. This and other Bedoop applications aid in reducing such hurdles.)

Product Marketing

Bedoop data relating to one product or service can be used to cross-market others products and services. Consider a consumer who purchases a pair of golf shoes. The box is Bedoop encoded. By presenting the box to a Bedoop system, the consumer is linked to a web page that presents various promotional offers. The consumer may, for example, elect to play a free round of golf at one or more identified local golf courses, or print a coupon for ten percent off any order of socks from an on-line sock merchant. (Various means can be employed to prevent multiple redemptions from a single box. One is a serial number that is tracked by the web page or cross-marketed merchant, and only honored once. Another is identification data corresponding to the consumer that is tracked to prevent multiple redemptions.)

Product tags can likewise be Bedoop-encoded. A tag from an article of Nike apparel can lead to the Nike on-line store, where the user can buy more merchandise. If the tag is from a soccer jersey, a certain tag manipulation (e.g., rotate left) may lead the user to a special-interest soccer page, such as for the World Cup. A tag on a golf glove may lead to a website of a local golf course. Twist left to reserve a tee time; twist right to review course maps and statistics. Bedoop kiosks can be provided in retail stores to let consumers use the Bedoop features.

Travel Planning Services

After making a reservation at a resort, a consumer is typically mailed (by email or conventional mail) various confirmation information. If not already printed, the consumer can print this information (e.g., a confirmation card).

Bedoop-encoding on the printed object can lead to web-based information relating to the reservation (e.g., reservation number, the consumer's name, arrival/departure dates, etc.). If the consumer wishes to make dinner or golf reservations, this object is presented to a Bedoop system—either at the user's home, at an airport kiosk, etc. The system recognizes the object type and encoded data, and establishes a link to a remote computer that provides various information and scheduling services for the resort. By manipulating the object (or otherwise) the consumer selects desired dinner and golf tee times. The system already has the reservation number (indexed by the UID), so tedious provision of such data is avoided.

In some embodiments, the remote computer is not maintained by the resort, but is rather maintained by an independent travel service. (The travel service may also maintain the DNS leaf node server.) The computer can present a web page (branded by the travel service or not) that offers the scheduling options desired by the user, and also presents links to other information and services (e.g., offering entry tickets to nearby attractions, and advertising nearby restaurants).

Airline tickets (or e-ticket confirmations) can be similarly encoded with Bedoop data. These items may be presented to Bedoop systems—at a traveler's home or in airports—to permit review and changing of travel itinerary, reserve hotels and rental cars, secure first-class upgrades, check the airplane's seating arrangement, review frequent flier status, scan tourist information for the destination, etc.

Movie Tickets

As indicated earlier, movie tickets can be encoded with Bedoop data identifying, e.g., the movie title and date. When a movie viewer returns home, the ticket stub can be presented to a Bedoop system. One of the options presented by the corresponding Bedoop application can be to launch a pay-per-view screening of the just-seen movie at a discounted rate. Another is to download the movie onto a writeable DVD disk at the viewer's home, perhaps serialized to permit playback only on that viewer's DVD player, or enabled for only a few playbacks, etc. (again, likely for a discounted fee). Still another option is to present web-delivered video clips from the movie. Another is to offer related merchandise for purchase, possibly at discount to retail. (These features may be available for only a limited period after the date encoded on the ticket stub.) Another is to alert the consumer to upcoming movies of the same genres, or with the same director or stars, or released by the same studio. Still another is to direct a web browser to an on-line ticket merchant for tickets to other movies. The consumer may navigate among these options by manipulating the ticket stub, or otherwise.

The same, or related, options can likewise be provided in response to Bedoop data detected from a book jacket presented to a Bedoop system.

Video Recording

A video recording device can be programmed to record a broadcast program by presenting a Bedoop sensor with a printed promotion for the program (e.g., an advertisement in a newspaper or TV Guide). Bedoop-encoded within the printed document is data by which the Bedoop system (which may be built into the video recorder or separate) can set the recording time, date, and channel.

Set Top Boxes

Many entertainment-related applications of Bedoop data can be implemented using television set top boxes. Such boxes include processors, and typically include a return channel to a control facility. The provision of a Bedoop chip and optical sensor can vastly increase the functionality these devices presently provide.

Special Event Tickets

Consider a ticket to a basketball game. By presenting the ticket to a Bedoop system, a user may access the web site of either team so as to review recent scores and statistics. The user may also obtain a web-based virtual tour of the arena, and review seating maps. Tickets for upcoming games may be ordered, as well as pay-per-view games and team souvenirs. For high-priced tickets, the user may be entitled to premium web features, such as on-line text-, audio-, or video-chat session with a team star on the day before the game.

Unlike conventional tickets, Bedoop-encoded tickets need not limit the user to a predetermined seat. While the ticket may be printed with a nominal seat, the user may present the ticket to a Bedoop sensor and access a web site at which a different seat can be reserved. On attending the event, the consumer presents the ticket to a Bedoop sensor that reads the ticket UID and looks up the seat assignment most-recently picked by the consumer. It then prints a chit entitling the consumer to take the seat earlier selected from the transactional web site.

Signet Rings

Signet rings have historically been used to indicate a person's identity or office. Such rings, or other items of personal jewelry, can be encoded with Bedoop data (either by texturing or printing) and presented as necessary to Bedoop systems. The extracted Bedoop data can lead to a secure web site indicating the person's name and other information (i.e., a web site that has anti-hacking measures to prevent illicit change of the stored identification information). Such a signet ring can be presented to Bedoop systems that require a high-confidence confirmation of identity/authorization before proceeding with a Bedoop function.

Post-It® Notes

Pads of Post-It® notes, or other pads of paper, can be marked by the manufacturer (either by texturing, water-marked tinting, ink-jet spattering, etc.) to convey steganographic data (e.g., Bedoop data). When such a note is presented to a Bedoop system, the system may launch an application that stores a snapshot of the note. More particularly, the application may mask the note-portion of the image data from the other image data, virtually re-map it to a rectangular format of standardized pixel dimensions, JPEG-compress the resulting image, and store it in a particular computer subdirectory with a name indicating the date of image acquisition, together with the color and/or size of the note. (These latter two data may be indicated by data included in the Bedoop payload.) If the color of the note is indicated by digital data (e.g., in the file name), then the image itself may be stored in grey-scale. When later recalled for display, the white image background can be flooded with color in accordance with the digital color data.

The Bedoop system may buffer several past frames of image data. When the object is recognized as a Post-It note whose image is to be saved, the system may analyze several such frames to identify the one best-suited for storage (e.g., check the spatial frequency content of the note as imaged in each frame, to identify the one with the finest detail), and store that one.

When a Post-It note is recognized by the Bedoop system, the system may emit a confirmation tone (or other response) to indicate that the object has been recognized, but not immediately execute the snapshot operation. Instead, the system may await a further instruction (e.g., gesture) to indicate what operation is desired.

By moving the note towards the sensor, for example, the user can signal that a snapshot operation is to be performed. (This closer presentation of the note may also permit the imaging system to capture a more detailed frame of image data.)

By moving the note away, the system may respond by reading, decompressing, and displaying the six most-recently stored Post-It note images, in tiled fashion, on the computer screen. The individual notes can be displayed at their original dimensions, or each can be re-sized to fill the full height or width of a tile. A user interface control (responsive to gestures, mouse operation, keyboard scroll arrows, etc.) allows the user to scroll back in time to any desired date.

The full 64-bit Bedoop payload of other embodiments may not be needed for Post-It notes. In the just-given example, for example, the Bedoop system responds to all Post-It notes in the same fashion. Thus, an abbreviated Bedoop format that indicates simply 'I'm a Post-It note, yellow, size 3".times.3"' can suffice. The twelve bit CLASS ID, with eight further bits to indicate color/size combinations, may be sufficient. Reducing the payload permits it to be more robustly encoded on small objects. (As noted below, Bedoop decoding systems can look for several different data formats/protocols in trying to extract Bedoop data from an object.)

Alignment of Documents for Other Purposes

While the just-described pre-marked paper triggered a Bedoop response when presented to a Bedoop sensor (i.e., take a snapshot of the paper), the markings can be used for purposes other than to trigger Bedoop responses.

Regardless of the particular data with which the paper is encoded, the embedded subliminal graticules, or other steganographically-encoded registration data, can be used by other applications to correct misalignment of scanned data. In a photocopier, for example, a document need not be placed exactly squarely on the glass platen in order to yield a properly-aligned photocopy. The scanner scans the skewed document and then detects the steganographic registration markings in the resulting scan data. This data is then processed to virtually re-register same, so that the registration markings are in a desired alignment. The processed scan data is then provided to the xerographic reproduction unit to yield a photocopy in which the skew effect is removed.

The same technique is likewise applicable to video recorders, digital cameras, etc. If such a device images an object (e.g., a photograph) with steganographic registration markings, these markings can be used as a guide in re-registering the resulting data to remove mis-alignment effects.

Postal Mail Information

Many contexts arise in which data to be presented to a consumer is valuable only if timely. The postal service mail is ill-suited for some such information due to the latency between printing a document, and its ultimate delivery to a recipient. Bedoop principles, however, allow the recipient to take a postal object that was printed well before delivery, and use it on receipt (i.e., present to a Bedoop system) to receive up-to-the-minute information. In this and other embodiments, the Bedoop data can also uniquely identify the addressee/recipient/user, so the web site can present data customized to that user.

Distributors of printed advertising can reward Bedoop-driven consumer visits to their web sites by issuing digital tokens or coupons that can be redeemed for premiums, cashback, etc. Every millionth visitor wins a million pennies (with appropriate safeguards, e.g., preventing more than one entry an hour).

Classes of Bedoop Encoding

The above-described embodiments focused on use of Bedoop data after decoding. Additional insight may be gained by examining the earlier part of the process—encoding.

Encoding can be performed in many contexts, which may be conceptualized as falling into three broad classes. The first is static marking, in which a document designer, pre-press service bureau, advertising agency or the like embeds Bedoop data. The second is dynamic marking, in which automated systems encode, or vary, Bedoop data "on the fly." Such systems can tailor the Bedoop data to particularly suit the context, e.g., to the moment, place, user, etc. The third is consumer marking, in which Bedoop data is added to a document at the time of printing.

The second class of encoding enables features not available from the first. Consider an American Express travel web page with information about travel to Hawaii. A DNS leaf node server points to this page in response to certain Bedoop data—e.g., data encoded in a magazine photograph of a Hawaiian beach scene.

Actually, all Bedoop data having a certain CLASS and DNS ID may lead to this web page, irrespective of the UID data. If the magazine photo is encoded with a particular "don't care" UID field (e.g., 1111111111111111111111), this may signal the originating Bedoop system—or any intervening system through which the Bedoop data passes—that arbitrary data can be inserted in the UID field of that Bedoop packet. The originating Bedoop system, for example, can insert a dynamically-configured series of bits into this field. Some of these bits can provide a profile of the user to the remote server, so that the Bedoop response can be customized to the user. (The user would naturally pre-approve information for such use so as to allay privacy concerns.)

As one example, the local Bedoop system can set the least significant bit of the UID field to a "0" if the user is male, or to a "1" if the user is female. The next four bits can indicate the user's age by one of sixteen age ranges (e.g., 3 or less, 4-5, 6-7, 8-9, 10-11, 12-13, 14-15, 16-17, 18-20, 21-24, etc.).

Alternatively, or in addition, the local Bedoop system can stuff the don't-care UID field (all of it, or in part) with signature data tending to uniquely identify the local Bedoop system (e.g., system serial number, a hash code based on unchanging data unique to that system, etc.) By reference to such data, the remote server can identify repeat visits by the same user, and can tailor its responses accordingly (e.g., by recalling a profile of information earlier entered by the user and stored at the remote server, avoiding the need for data re-entry).

More on Optical Input Devices

It is expected that image input devices will soon become commonplace. The provision of digital cameras as built-in components of certain computers (e.g., the Sony Vaio laptops) is just one manifestation of this trend. Another is camera-on-a-chip systems, as typified by U.S. Pat. No. 5,841,126 and detailed in Nixon et al., "256.times.256 CMOS Active Pixel Sensor Camera-on-a-Chip," IEEE J. Solid-State Circuits, Vol. 31(12), pp. 2046-2051 (1996), and Fossum, "CMOS Image Sensors: Electronic Camera-on-a-Chip," IEEE Transactions of Electron Devices, vol. 44, No. 10, October 1997. Still another is head-mounted cameras (as are presently used in some computer-augmented vision systems). These and other image input devices are all suitable for use in Bedoop systems.

Camera-on-a-chip systems can be equipped with Bedoop detector hardware integrated on the same chip substrate. This hardware can be arranged to find and decode Bedoop data from the image data—notwithstanding scale, rotation, differential scaling, etc. Gestural decoding can also be provided in hardware, with the resulting data output in packet form on a serial output bus. Such a chip can thus provide several outputs—image data (either in raw pixel form, or in a data stream representing the image in one of various image formats), 64 bits of Bedoop data (serially or in parallel), and decoded gesture data.

In other embodiments, the Bedoop detector (and/or the gestural decoder) can be on a substrate separate from the camera system.

To accommodate different Bedoop data formats and protocols, the hardware can include RAM or ROM in which different format/protocol information is stored. (These different formats/protocols can relate, e.g., to Bedoop systems employing different data payload lengths, different subliminal grids, different encoding techniques, etc.) As the Bedoop system stares out and grabs/analyzes frames, each frame can be analyzed in accordance with several different formats/protocols to try and find a format/protocol that yields valid Bedoop output data.

Movable Bedoop Sensors

Although the illustrated Bedoop systems are generally stationary, they need not be so. They can be portable. Some such systems, for example, employ palmtop computers equipped with optical sensor arrays. If the palmtop is provided with live network connectivity (e.g., by wireless), then Bedoop applications that rely on remote computers can be implemented just as described. If the palmtop is not equipped with live network connectivity, any Bedoop applications that rely on remote computers can simply queue such communications, and dispatch same when the palmtop next has remote access (e.g., when the palmtop is next placed in its recharger and is coupled to a modem through which internet access can be established).

Another variant is a Bedoop sensor that is movable around a desk or other work-surface, like a mouse. Such a sensor can be coupled to the associated computer by cabling, or a wireless interface can be used. The peripheral may be arranged for placement on top of an item in order to read digital data with which the object is marked. (Built-in illumination may be needed, since the device would likely shadow the encoding.) Some forms of such peripherals are adapted to serve both as general purpose digital cameras, and also as Bedoop sensors.

Such a peripheral would find many applications. In "reading" a magazine or book, for example, it may be more intuitive to place a Bedoop reader "on" the object being read, rather than holding the object in the air, in front of a Bedoop sensor. This is particularly useful, e.g., when a magazine page or the like may have several differently-encoded Bedoop sections (corresponding to different articles, advertisements, etc.), and the user wants to assure that the desired Bedoop-encoded section is read.

The "bookmark" paradigm of internet browsers might be supplemented with paper bookmarks, e.g., Bedoop data encoded on one or more pages of paper. To direct a browser to a particular bookmarked destination, the peripheral is simply placed on top of the page (or part thereof) that is marked with the corresponding Bedoop data. A user may print a "map" comprised of postage stamp-sized regions tiled together, each of which regions represents a favorite web destination.

Such a map may be printed on a mouse pad. Indeed, mouse pads with certain maps pre-encoded thereon may be suitable as promotional materials. A company may offer to print a family photograph on such a pad. Encoded within the photograph or the pad texture are addresses of web sites that have paid a fee to be accessible in this manner on a user's desk.

Like mice—which are provided with buttons, roller wheels, and roller buttons in addition to X-Y encoders—movable Bedoop encoders can likewise be provided with auxiliary switches and roller inputs to complement the data input provided by the optical sensor. Indeed, some embodiments integrate the functions of Bedoop peripheral with a mouse. (The undersides of mice are generally under-utilized, and can readily be equipped with an image sensor.)

Gestural input can readily be provided by such a peripheral—in this context moving the sensor rather than the object.

Watermarking Techniques

There are nearly as many techniques for digital watermarking (steganographic data encoding) as there are applications for it. The reader is presumed to be familiar with the great variety of methods. A few are reviewed below.

The present assignee's U.S. Pat. No. 6,345,104 shows techniques by which very fine lines can be printed on a medium to slightly change the medium's apparent tint, while also conveying digital data. Commonly-owned U.S. Pat. No. 6,449,377 details how the contours of printed imagery can be adjusted to convey digital data. (That technique can be applied to printed text characters, as well as the line art imagery particularly considered.) The assignee's U.S. Pat. No. 5,850,481 details how the surface of paper or other media can be textured to convey optically-detectable binary data. The assignee's U.S. Pat. Nos. 5,841,886 and 5,809,160 detail various techniques for steganographically encoding photographs and other imagery.

Some watermarking techniques are based on changes made in the spatial domain; others are based on changes made in transformed domains (e.g., DCT, wavelet). Watermarking of printed text can be achieved by slight variations to character shape, character kerning, line spacing, etc.

Data glyph technology, as detailed in various patents to Xerox, is usable in many of the applications detailed herein.

The foregoing is just a gross under-sampling of the large number of watermarking techniques. The artisan is presumed to be familiar with such art, all of which is generally suitable for use in the applications detailed herein.

More generally, essentially any data encoding method that permits recovery of the encoded data from optical scan data can be employed. Bar codes (1D and 2D) are but the most familiar of many such optically-detectable data encoding techniques.

CONCLUSION

Having described and illustrated the principles of our technology with reference to illustrative embodiments, it should be recognized that the technology is not so limited.

For example, while certain of the embodiments were illustrated with reference to internet-based systems, the same techniques are similarly applicable to any other computer-based system. These include non-internet based services such as America Online and Compuserve, dial-up bulletin board systems, etc. Likewise, for internet-based embodiments, the use of web browsers and web pages is not essential; other digital navigation devices and other on-line data repositories can be similarly accessed.

Similarly, while the details of the preferred Bedoop system were particularly given, the underlying principles can be employed in numerous other forms.

For example, one other form is to steganographically encode physical objects with Digital Object Identifiers (DOIs). The Center for National Research Initiatives and the Digital Object Identifier Foundation (www.doi.org) have performed extensive work in establishing an infrastructure by which digital objects can be distributed, tracked, and managed. Some of this same infrastructure and technology can be adapted, in accordance with the teachings provided above, to associate new functionality with physical objects.

Another form is not to reference a remote data repository by data embedded on an object, but instead to encode the ultimate data directly on the object. A photograph, for example, can be literally encoded with a telephone number. On presenting the photograph to an optical sensor on the telephone, the telephone can analyze the optical information to extract the telephone number, and dial the number, without the need for any external data. Similarly, a printed office document (e.g., spreadsheet) can be encoded with the path and file name of the corresponding electronic file, obviating the need for indirect linking (e.g., to a database to correlate a UID to a computer address). Most of the above-described embodiments are suitable for such direct encoding of the related data.

In the business card example given above, the detailed techniques can be supplementary to existing optical character recognition techniques. That is, the image data from an optical sensor can be applied both to a Bedoop decoder and to an OCR system. Text characters discerned by the OCR system can be entered directly into a contacts manager personal database. The techniques employed in the Bedoop system to locate the encoded object and handle visual distortion (e.g., the visual artifacts due to scale, rotation, etc.) can advantageously be used in OCR detection as well, permitting extraction of the OCR information without careful placement of the card.

While certain of the foregoing embodiments made reference to ink-jet printing, similar advantages can often be obtained with other printing technologies, e.g., laser/xerographic printing, offset printing, etc.

In the foregoing embodiments, Bedoop decoding generally proceeded from image data obtained from a physical object. However, in some contexts, it is advantageous to Bedoop-decode image data provided electronically, e.g., over the internet.

Likewise, while the foregoing embodiments generally relied on Bedoop image sensors that stared out for an object at an expected point, in alternative embodiments, sensors that seek rather than stare can be employed (as was illustrated above in connection with the elevator example)

Similarly, while the illustrated embodiments generally employed sensors that repeatedly grabbed frames of image data, this need not be the case. Single frame systems, such as flatbed scanners, and video systems arranged to grab single frames—with or without TWAIN interfaces—can alternatively be used.

As indicated above, while steganographic encoding of the digital data is used in the preferred embodiments, visible forms of digital encoding—such as bar codes—can naturally be employed where aesthetic considerations permit.

In certain of the embodiments, digital data conveyed by means other than optical can be used. Electromagnetic detection (e.g., of the sort used in proximity-based card-access systems) can be arranged to decode digital data, permitting "at-a-distance" reading of data from physical objects, just as in the foregoing embodiments.

Since the Bedoop image sensors typically acquire plural frames of data, the extraction of the digital data can be based on more than a single image frame. More confidence in the results may be accumulating decoded data over several frames. Moreover, movement of the object within the sensor's field of view may permit the system to acquire information from other perspectives, etc., enhancing system operation.

While the preferred embodiments employ 2-D image sensors (e.g., CCDs), other optical sensing technology can alternatively be employed. Supermarket laser scanners, for example, can read bar-code data. Raster-scanning of such systems can permit acquisition of 2-D data (either in bit-mapped form, or grey-scale).

While the illustrated embodiments used a 12/24/24 bit protocol for CLASS/DNS/UID data, other arrangements can of course be used. In some applications it is advantageous for the protocol to more nearly match those commonly used for internet communications. For example, IP addresses for internet Domain Name Servers (DNS) are presently 32 bits, with extension to 64 or 128 bits foreseen in the near future. The DNS field in Bedoop systems can be follow the internet standard.

Some embodiments can advantageously employ texture-based Bedoop encoding of objects. Bedoop texturing can be effected by various means, including pressure rollers, chemical or laser etching, etc.

While the foregoing embodiments have generally employed planar objects to convey the digital encoding, this need not be the case. Objects of other shapes can likewise be employed. Some shapes present relatively straightforward image processing tasks. Data imaged from a soft drink can or other cylindrical surface, for example, is fairly easy to remap using known geometrical transforms so as to essentially "unwrap" the printing from the can. Other geometries can present more complex re-mappings, but are likewise generally within the capabilities of the artisan. (Such remapping is facilitated by encoding in the data certain reference markings, such as subliminal graticules, etc. The unknown 3D shape of the object being imaged can usually be inferred from the apparent warping of the reference markings in the 2D image data generated by the scanner. Once the warping is characterized, it is generally straightforward to un-warp so as to prepare the image data for decoding.)

It was once popular to predict that paper documents would be replaced with electronic media. In hindsight, electronic media may be recognized as a poor surrogate for paper. Electronic media conveys information flawlessly, but is lacking in experiential attributes. We can hold paper, stack it, own it, deface it, give it, guard it, etc. It provides an opportunity for physical dominion entirely lacking with electronic media.

From the foregoing discussion it can be seen that, rather than replacing paper with electronic media, perhaps the future lies in giving paper digital attributes—hybridizing the physical experience of paper with the technical advantages of digital media. Such an arrangement makes available a great wealth of new functionality, now accessible through familiar paper items, rather than through a "computer input peripheral."

To provide a comprehensive disclosure without unduly lengthening this specification, applicants incorporate by reference the patents, applications, and publications identified above.

In view of the many embodiments to which the principles of our technology may be applied, it should be recognized that the detailed embodiments are illustrative only and should not be taken as limiting the scope of our technology. Rather, we claim as our invention all such embodiments as fall within the scope and spirit of the following claims, and equivalents thereto.

Appendix A

Application 60/134,782 Methods and Systems Employing Digital Watermarking

Field of the Invention

The present invention relates to applications of digital watermarking in conjunction with audio, video, imagery, and other media content.

Background

Watermarking (or "digital watermarking") is a quickly growing field of endeavor, with several different approaches. The present assignee's work is reflected in U.S. Pat. Nos. 5,841,978, 5,768,426, 5,748,783, 5,748,763, 5,745,604, 5,710,834, 5,636,292, 5,721,788, and laid-open PCT applications WO97/43736 and WO99/10837. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

Watermarking has various uses, but the present specification details several new uses that provide functionality and features not previously available.

Brief Description of the Drawings

Drawings Omitted

FIG. 1 is a diagram showing the participants, and channels, involved in the distribution of music.

FIG. 2 shows a conceptual model of how music artists, record labels, and E-Music distributors can all interact with a Media Asset Management System, of which several are detailed in the following specification.

Detailed Description

For expository convenience, much of the following discussion focuses on music, but the same principles and techniques are largely or wholly applicable to other source data, whether non-music audio, video, still imagery, printed materials, etc.

Music Asset Management

Referring to the figures, the music distribution process begins with a creative artist 10. The artist's music has traditionally been distributed by a record label 12. (While the following discussion refers to distribution through such a label, it should be understood that such distribution can just as well be effected directed under the artist's control, without a record label intermediary.)

In traditional distribution 14, the record label produces tangible media, such as records, tapes, videos (e.g. music videos), and CDs 16. These media are physically distributed to end-consumers 18. Additionally, the label 12 distributes the music media to outlets 20, such as radio and TV stations, cable and satellite systems, etc., which broadcast (or narrowcast) the artist's work to an audience. Distribution through such media outlets may be monitored by playout tracking services. Playout tracking data, collected by firms including Arbitron, Nielsen, ASCAP, BMI, etc., can be used to compute royalty payments, to verify broadcast (e.g. for advertising), etc.

Increasingly, the distribution of the music to the media outlets is performed electronically. Such distribution first took the form of analog audio over high quality landlines or satellite channels. Digital audio quickly supplanted analog audio in such distribution channels due to higher fidelity.

More recently, distribution of the music from the record labels to the media outlets has occurred over secure links, now including the internet. Such security was first provided simply by scrambling the audio signal or data. More sophisticated "container"-based systems are now coming into vogue, in which the audio is "packaged" (often in encrypted form) with ancillary data.

Electronic distribution of music to the consumer is also gaining popularity, presently in the MP3 format primarily. The music providers may deal directly with the public, but more commonly effect such consumer distribution through a newly emerging tier of digital media outlets, such as internet sites that specialize in music. From such sites, consumers can download digital audio files into personal digital audio players. (The Diamond Rio, and the Audible MobilePlayer devices are some of the first of what will doubtless be a large number of entrants into this personal internet audio appliance market.) Or the downloaded data can be stored by the consumer-recipient onto any other writeable media (e.g. hard disk, CD, DVD, tape, videotape, etc.). Typically a personal computer is used for such downloading, but this intermediary may be dispensed with by coupling next generation of personal audio appliances to an internet-like link The data downloaded by the consumer can be stored either in the native digital format, translated into another digital format (which translation may include decryption), converted into analog and recorded in analog form, etc.

Unauthorized copying or use of the music can occur anywhere in the foregoing channels. However, one of the greatest risks occurs once the music has been delivered to the consumer (whether by tangible media, by traditional broadcast media outlets, by emerging digital distribution, or otherwise).

The general idea of embedding auxiliary data into music (i.e. watermarking) has been widely proposed, but so far has been of limited applicability.

For example, GoodNoise is planning to embed a digital signature—termed a multimedia identifier, or MMI—in its MP3 music. MMI will register the song and its author with a licensing number. In addition to providing information about the songwriter and distributor, this digital encoding may also include lyrics, liner notes, and other information. But all of the proposed uses serve only to convey information from the distributor to the consumer; use for "tracking" is actively disclaimed. (Wired News, "GoodNoise Tags MP3 Files," Feb. 3, 1999.)

The Genuine Music Coalition—a partnership of various companies in the music distribution business—likewise has announced plans to employ watermarking of MP3 music. The watermarking technology, to be provided by Liquid Audio, will convey data specifying the artist or producer contact, copyright data, and a number to track ownership. The Coalition hopes that the provision of this embedded information will help thwart piracy. Industry observers believe Liquid Audio will next introduce playback technology only plays audio in which its watermark is detected. (Wired News, "Liquefying MP3," Jan. 23, 1999.)

A similar initiative has been announced by the Recording Industry Association of America (RIAA). Termed the Secure Digital Music Initiative (SDMI), the program seeks to define a voluntary specification that will assure proper compensation to those who produce and distribute music. One element of the system will likely be a watermarking component. (Dow Jones Newswire, "Spurred By Maverick Technology, Music Industry Eyes Web," Dec. 31, 1998.)

Yet another initiative has been announced by Solana and ASCAP. Other companies promoting watermarking for music include Aris Technology, MCY.com, and AudioSoft.

The watermark payload can represent various types of data. An exemplary payload includes data relating to the artist, distribution entity, title, and copyright date/proprietor. Additionally, the payload can include a digital object identifier—an ISBN-like number issued by a central organization (e.g. a rights management organization) to uniquely identify the work.

Such payload data can be encoded literally (e.g. the title by a series of ASCII characters, etc.). In other embodiments, codes or abbreviations can be employed—with each code having a known meaning. In still other embodiments, the data can be meaningless by itself, but may serve as a key (e.g., a Unique Identifier, or UID) into a remote data database or repository. An example of such a remote data repository is a web site at a Master Global Address (MGA) associated with content, as detailed below.

An exemplary data payload may, for example, have the following format:
STR00001##
Where A is a six-byte (8-bits to a byte) ASCII string serving as a digital object identifier (which may serve as a link to a Master Global Address through a default name server, as discussed below), B is a two-byte ASCII field serving as a key into an "artist" field of the remote database, C is a three-byte ASCII field serving as a key into a "title" field of the remote database; D is a 14-bit field serving as a key into a "label" field of the remote database, E is an 8-bit integer representing the work's year of first publication (with 0 representing the year 2000); F is a 10-bit field serving as a key into a "price" field of the remote database, G is a two-byte usage control string (detailed below), H is a streaming data channel, and I is a string of bits serving as a cyclic redundancy checksum for the foregoing. (More sophisticated error correcting checksums can, of course, be employed.) This payload format totals 136 bits, exclusive of the CRC coding and the streaming data channel.

This payload is encoded repeatedly, or redundantly through the music, so that the full payload can be decoded from partial excerpts of the music.

The encoding is also desirably perceptually adaptive, so that higher energy encoding is employed where the listener is less likely to perceive the additional "noise" introduced by the encoding, and vice versa. Various techniques for perceptually adaptive encoding are known. For example, some tie the amplitude of the encoded signal to the instantaneous amplitude of the music. Others exploit psychoacoustic "masking" of one signal by a spectrally- or temporally-adjoining signal of higher energy. Still other approaches fill gaps in the music's spectrum with watermark energy. These and other techniques are detailed in the patents incorporated by reference.

In other embodiments, perceptually adaptive encoding is not used. In some such embodiments, no tailoring of the temporal or spectral characteristics of the watermark signal is employed. In others, the watermark signal is spectrally filtered to emphasize low frequency audio components (e.g. less than 500 hz), high frequency audio components (e.g. higher than 2500 hz), or mid-frequency audio components (500-2500 hz).

The streaming data field channel (H) is a medium by which data can be conveyed from a distribution site (or other site) to the end user. Such data may be entirely unrelated to the underlying work. For example, it may serve a utilitarian purpose, such as conveying data to a memory in the consumer device to replace previously-stored data that is out-of-date. It may be a commercial channel on which bandwidth is sold for access to the consumer or the consumer's device. Essentially any purpose can be served by this streaming data field. Unlike most of the other fields, the streaming data field may not endlessly repeat the same data, but can convey data that changes with time.

Desirably, the encoding is performed in a manner permitting recovery of the watermark data even if the audio is corrupted, e.g. by format conversion, re-sampling, tape wow and flutter, compression, coding, or various forms of audio processing (e.g. filtering, pre-emphasis, re-scaling, etc.). One way to provide for such robustness is to encode a signal of known character that can be recognized through all such corruption. By identifying such known signal, the watermark signal can then be decoded. (The known signal can take various forms, e.g. a synchronization signal, a marker signal, calibration signal, a universal code signal as described in applicant's patents, etc.)

In some embodiments, a watermark "dial-tone" signal is provided. This dial-tone signal is a low amplitude, relatively wideband, repetitive signal that commonly conveys only limited information (e.g. a single bit of information). Its presence in an audio signal can serve as a "do not record," or similar instruction signal. Alternatively, or in addition, the dial-tone signal can serve as an aid in "locking" to a plural-bit digital watermark signal that is also encoded in the audio. For example, the cyclical repetition of the signal can serve to identify the start of the plural-bit digital watermark signal. Or the spectrum or repetition rate of the signal can identify any temporal corruption of the audio. An exemplary such signal is detailed as a "simple universal code" in U.S. Pat. No. 5,636,292.

A track of music can be pre-authorized for specified types of use. For example, the usage control string of the watermark payload may include a six-bit field detailing the classes of devices for which the audio is authorized. Each bit would correspond to a different class of device. Class 1 devices may be personal playback devices with only analog-audio output. Class 2 devices may be personal entertainment devices capable of outputting music in digital (e.g. MP3, redbook, *.WAV) format, as well as analog audio. Class 3 devices may be personal computer systems (i.e. with essentially unlimited ability for processing and outputting digital audio). Etc., etc. A device to which such MP3 audio is provided would check the usage control string data to determine whether it is authorized to utilize the audio. A personal playback device with analog-only output, for example, would examine the first bit of the usage control string. If it was "1," the device would be authorized to use (i.e. playback) the MP3 data; if it was a "0," the device would refuse to play the music.

In addition to pre-authorization for certain classes of devices, the usage control string can also include bits indicating the number of permitted playbacks. This data can be encoded in bits seven through nine, representing eight possibilities: [0307]0—no playback permitted [0308]1—single playback permitted [0309]2—two playbacks permitted [0310]3—three playbacks permitted [0311]4—four playbacks permitted [0312]5—five playbacks permitted [0313]6-10—playbacks permitted [0314]7—unlimited playbacks permitted [0315]8—refer to associated data (within the watermark, or stored at a remote site) which specifies number of permitted playbacks.

The playback device may include a non-volatile store in which the number of permitted playbacks is stored for each track of music. The device would decrement this number at the beginning of each playback.

The usage control string can also include a two-bit field (bits ten and eleven) indicating recording permissions. A value of 0 means that data corresponding to the MP3 audio (regardless of digital format) should never be made available to another digital device. A value of 1 means that the data corresponding to the MP3 data may be made available once to another digital device. A value of 2 means that the data may be made available an unlimited number of times to other digital devices. (Value 3 is reserved.)

Another data field that can be included in an audio watermark is a rating that indicates age-appropriateness. Music with violence or sexual themes might be given a rating akin to the MPAA "PG-13" or "R" rating. Audio appliances may be programmed to recognize the rating of incoming music, and to interrupt playback if the rating exceeds a certain threshold setting. Various known techniques can be employed to assure that such settings cannot readily be changed, e.g., by juvenile listeners.

Another data field that can be included in an audio watermark is a date field. This field can indicate either the date the music was watermarked, or a date in the future on which certain rights associated with the music should change. Some consumers, for example may not wish to purchase perpetual playback rights to certain musical selections. The right to play a selection for 6 months may suffice for many consumers, especially if the price is discounted in view of the limited term. Such an arrangement would not be wholly disadvantageous to music distributors, since some consumers may end up purchasing music twice if their initial assessment of a musical selection's appeal was too short-sighted. (Naturally, the playback equipment would require a source of real-time clock data against which the date field in the watermark can be checked to ensure that the playback rights have not yet expired.)

Another of the data fields that can be included in an audio watermark specifies technical playback parameters. For example, the parameter can cause the playback appliance to apply a spectral equalization that favors bass frequencies, or treble frequencies, or mid-range frequencies, etc. Other pre-configured equalization arrangements can similarly be invoked responsive to watermark data. Likewise, the parameter can invoke special-effects provided by the playback appliance, e.g., echo effects, reverb, etc. (Again, such parameters are usually represented in an abbreviated, coded form, and are interpreted in accordance with instructions stored in a memory (either in the playback appliance, or linked thereto).

The same data fields and principles can be applied to non-audio content. In video, for example, watermarked data can adaptively control the display monitor or playback parameters (e.g., color space) to enhance the viewing experience.

Music Asset Management/Commerce

The majority of domestic music piracy is not organized. Rather, it is a crime of opportunity and convenience. If the crime were made more difficult, the alternative of obtaining a copy through legitimate channels would be less onerous. Similarly, if the procedure for obtaining a copy through legitimate channels were simplified, the incentive for piracy would be reduced. Watermarking facilitates both—making the crime more difficult, and making legitimate music acquisition easier.

Consider, for example, the pricing of music in conventional record stores. A CD (compact disk) may cost $15, but its sale may be driven by just one or two popular songs on the disk. To obtain these songs, the consumers must purchase the entire disk, with perhaps a dozen songs of no particular interest. This, in essence, is a tying arrangement that benefits the record labels while prejudicing the consumers. Given these circumstances, and a ready opportunity to make copies, it is not surprising that customers sometimes make illicit copies.

One classic technique of avoiding purchase of a complete collection of music, when only one or two songs is desired, is to record the music off the radio. While of dubious legality, this technique was popular in the era of combined cassette/radio players. However, the desired music was sometimes difficult to encounter in a radio broadcast, and the quality was less than superb.

The combined cassette/radio player has now evolved into a general purpose computer with wide-ranging functionality, and other sophisticated devices. Music can be acquired off the web, and can be recorded in various forms (e.g. in a personal MP3 player, stored on a hard disk, stored on a writeable CD-ROM, played back and recorded on analog cassette, etc., etc.). The quality can be quite high, and the erratic broadcast time problems of radio broadcasts have been overcome by the web's on-demand delivery mechanisms. (Moreover, the music can be downloaded in faster-than-realtime, a further benefit over recording-off-the-air techniques.)

One hybrid between the new and old is a novel radio (e.g., for use in a car) that has a "capture" button on the front panel (or other form of user interface, e.g., a Capture icon on a GUI). If a user hears a song they want to record and keep, they press the Capture button while the song is playing. In response, the radio device decodes a watermark embedded in the music, and thereby knows the identity of the music. The radio then makes a wireless transmission identifying the user and the desired song. A local repeater network picks up the wireless signal and relays it (e.g. by wireless rebroadcast, by modem, or other communication medium) to a music clearinghouse. The clearinghouse charges the user a nominal fee (e.g. via a pre-arranged credit card), and queues the music for download to a predetermined location associated with the user.

In one embodiment, the predetermined location is the user's own computer. If a "live" IP address is known for the user's computer, the music can be transferred immediately. If the user's computer is only occasionally connected to the internet, the music can be stored at a web site (e.g. protected with a user-set password), and can be downloaded to the user's computer whenever it is convenient.

In other embodiments, the predetermined location is a personal music library maintained by the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own internet connection. Or it can be equipped with wireless capabilities, permitting it to receive digital music from wireless broadcasts (e.g. from the clearinghouse). In either case, the library can provide music to the user's playback devices by short-range wireless broadcast.

By such arrangement, a user can conveniently compile an archive of favorite music—even while away from home.

Many variants of the foregoing are of course possible. The radio can be a portable unit (e.g. a boombox, a Walkman radio, etc.), rather than an automotive unit. The UI feature employed by the user to initiate capture a musical selection need not be a button (physical or on-screen). For example, in some embodiments it can be a voice-recognition system that responds to spoken commands, such as "capture" or "record." Or it can be a form of gesture interface.

Instead of decoding the watermark only in response to the user's "capture" command, the radio can decode watermarks from all received programs, and keep the most recent in a small FIFO memory. By such arrangement, the user need not issue the capture instruction while the song is playing, but can do so even after the song is finished.

In some embodiments, data corresponding to the watermark can be made available to the user in various forms. For example, it can be presented to the user on an LCD screen, identifying the artist and song currently playing. If a corresponding UI button is activated, the device can so-identify the last several selections. Moreover, the data need not be presented to the user in displayed form; it can be annunciated by known computer-speech technologies instead.

In embodiments in which the watermark does not convey ASCII text data, but instead conveys UIDs, or coded abbreviations, the device must generally interpret this data before presenting it to the user. In an illustrative embodiment, the device is a pocket-sized FM radio and is equipped with a 1 megabyte semiconductor non-volatile RAM memory. The memory includes a data structure that serves as a look-up table, matching code numbers to artist names and song titles. When the user queries the device to learn the identify of a song, the memory is indexed in accordance with one or more fields from the decoded watermark, and the resulting textual data from the memory (e.g. song title and artist) is annunciated or displayed to the user.

In most applications, such memory will require frequent updating. The RF receiver provides a ready mechanism for providing such updated data. In one embodiment, the radio "awakens" briefly at otherwise idle moments and tunes to a predetermined frequency at which updated data for the memory is broadcast, either in a baseband broadcast channel, or in an ancillary (e.g. SCA) channel.

In variants of the foregoing, internet delivery of updated memory data can be substituted for wireless delivery. For example, the artist/song title memory in the personal player can be updated by placing the player in a "nest" every evening. The nest (which may be integrated with a battery charger for the appliance) can have an internet connection, and can exchange data with the personal device by infrared, inductive, or other proximity-coupling technologies, or through metal contacts. Each evening, the nest can receive an updated collection of artists/song titles, and can re-write the memory in the personal device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener can send a copy of the song to the friend. This instruction can be issued by pressing a "Send" button, or by invoking a similar function on a graphical (or voice- or gesture-responsive) user interface. In response, the appliance so-instructed can query the person as to the recipient. The person can designate the desired recipient(s) by typing in a name, or a portion thereof sufficient to uniquely identify the recipient. Or more typically, the person can speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should stored or queued, the format in which the music should be delivered, etc.) stored therein. In response to such command, the appliance dispatches instructions to the clearinghouse, including an authorization to debit the sender's credit card for the music charge. Again, the clearinghouse attends to delivery of the music in a desired manner to the specified recipient.

Still further, a listener may query the appliance (by voice, GUI or physical button, textual, gesture, or other input) to identify CDs on which the then-playing selection is recorded. Or the listener may query the appliance for the then-playing artist's concert schedule. Again, the appliance can contact a remote database, relay the query, and forward data from the watermark payload identifying the artist and/or song title to which the query relates. The database locates the requested data, and relays same back to the appliance for presentation (via a display, by machine speech, or other output) to the user. If desired, the user can continue the dialog with a further instruction, e.g., to buy one of the CDs on which the then-playing song is included. Again, this instruction may be entered by voice, GUI, etc., and dispatched from the appliance to the clearinghouse, which can then complete the transaction in accordance with pre-stored information (e.g. credit card account number, mailing address, etc.). A confirming message is relayed to the appliance for presentation to the user.

While the foregoing transactions require a link to a remote site or database, other watermark-based consumer services can be provided without such a link. For example, a user can query the appliance as to the artist or song-title of the selection currently playing. The appliance can consult the embedded watermark data (and optionally consult a memory to determine the textual names associated with coded watermark data), and provide the requested information to the user (e.g., by a display, annunciation, or other output).

The foregoing concepts (e.g. Capture, Send, etc.) can also be employed in connection with internet—rather than radio-delivery of music. (The following discussion is illustrated with reference to the "Capture" function, but it will be recognized that the other earlier-discussed features can be similarly implemented.)

There are many commercial web sites that sell audio (in CD form or otherwise), and offer limited free music downloads, (or music clips) as an enticement to lure consumers. But there are also a great number of music web sites that have no commercial pretense. They are hosted by music lovers strictly for the enjoyment of other music lovers. When music is downloaded from such a web site, the end-user's computer can analyze the digital data to decode watermark data therefrom. Again, the user can be presented with a "Capture" button that initiates a commercial transaction, by which a complete copy of the then-downloaded audio is sent to a prearranged storage location, and the user's credit card is debited accordingly. This transaction can occur independently of the site from which the music is downloaded (e.g. through the clearinghouse referenced above).

While the "Capture" button can be presented on the web-site, this would generally not be in keeping with the non-commercial nature of such web sites. Instead, in an exemplary embodiment, the Capture feature is a software program resident at the user's computer. When this software program is invoked by the user, a socket channel is instantiated between the user's computer and the clearinghouse over the then-existing internet connection. The decoded watermark data and user ID is transmitted to the clearinghouse over this channel, without interrupting the user's other activity (e.g. downloading music from the non-commercial web site). In response, the clearinghouse transmits the music to the prearranged location and attends to billing In some embodiments, a watermark detector is included as part of the operating system, and constantly monitors all TCP/IP, or other internet, data received by the user's computer, for the presence of watermarks. In such case, when the Capture feature is invoked, the program examines a memory location in which the operating system stores the most-recently received watermark data. In another embodiment, the computer does not monitor all internet traffic for embedded watermark data, but includes an API that can be called by the Capture program to decode a watermark from the data then being received. The API returns the decoded watermark data to the Capture program, which relays same to the clearinghouse, as above. In still another embodiment, the watermark decoder forms part of the Capture program, which both decodes the watermark and relays it to the clearinghouse when the Capture program is invoked by the user.

There are various techniques by which the Capture program can be selectively invoked. One is by a keyboard macro (e.g. by a combination of keyboard keys). Another is by a program icon that is always presented on the screen, and can be double-clicked to activate. (Again, confirmation processes may be called for, depending on the likelihood of inadvertent invocation.) Many other techniques are likewise possible.

In the just-contemplated scenario, the Capture operation is invoked while the user is downloading music from a non-commercial web site. This seems somewhat redundant, since the downloading—itself—is transferring music to the user's computer. However, the Capture operation provides added value.

In the case of streaming audio, the audio is not typically stored in a location in which it can be re-used by the consumer. It can be listened-to as delivered, but is then gone. Capturing the audio provides the user a copy that can be played repeatedly.

In the case of downloaded music files, the music may have been encoded to prevent its recordal on other devices. Thus, while the user may download the music onto a desktop computer, copy-prevention mechanisms may prevent use of that file anywhere else, e.g. on a portable music appliance. Again, Capturing the audio provides the user a copy that can be transferred to another device. (The music file provided by the clearinghouse can have copy-prevention limits of its own—e.g., the file can be copied, but only once, or the file can be copied only onto devices owned by the user.)

(Confirmation of device ownership can be implemented in various ways. One is to identify to the clearinghouse all music devices owned by a user at the time the user registers with the clearinghouse (supplemented as necessary by later equipment acquisitions). Device IDs associated with a user can be stored in a database at the clearinghouse, and these can be encoded into the downloaded music as permitted devices to which the file can be copied, or on which it can be played.)

The commerce opportunity presented by non-commercial music web-sites is but one enabled by digital watermarks. There are many others.

To take one example, consider the media by which music and artists are presently promoted. In addition to radio air-time, these include music videos (a la MTV), fan magazines, web advertisements, graphical icons (e.g. the Grateful Dead dancing bears), posters, live events, movies, etc. Watermarked data can be used in all such media as a link in a commercial transaction.

A poster, for example, typically includes a photo of the artist, and may comprise cover-art from a CD. The photo/art can be digitally watermarked with various types of data, e.g., the artist's identify, the record label that distributes the artist's work, the music project being particularly promoted by the poster (e.g. a CD, or a concert tour), a fan web-site related to the artist, a web-site hosted by the record label for selling audio in CD or electronic form, a web-site from which free music by the artist can be downloaded, data identifying the poster itself, etc.

A user, equipped with a portable appliance that merges the functions of palmtop computer and digital camera, can snap an image of the poster. The processor can decode the watermarked data, and initiate any of various links based on the decoded data.

In an exemplary embodiment, after snapping the picture, the user invokes a software program on the device that exposes the various links gleaned from the snapped image data. Such a program can, for example, present the option of linking to the artist's fan web site, or downloading free streaming audio or music clips, or ordering the promoted CD, or requesting the above-noted clearinghouse to download a personal copy of selected song(s) by the artist to the user's personal music library, etc. (The device is presumed to have a wireless internet link. In devices not having this capability, the requested actions can be queued and automatically executed when a link to the internet is available.)

Still more complex transactions can be realized with the use of a remote database indexed by digital watermark fields decoded from the poster. For example, the poster may promote a concert tour. Fields of the digital watermark may identify the artist (by a code or full text), and a web site or IP address. The user appliance establishes a link to the specified site, and provides the artist identifier. In response, the site downloads the tour schedule for that artist, for display on the device. Additionally, the downloaded/displayed information can include a telephone number that can be used to order tickets or, more directly, can indicate the class of seats still available at each (or a selected) venue, and solicit a ticket order from the user over the device. The user can supply requested information (e.g. mailing address and charge card number) over the return channel link (wireless or wired, as the case may be), and the ticket(s) will be dispatched to the user. In the case of a wireless link, all of this can occur while the user is standing in front of the movie poster.

Similar systems can be implemented based on watermark data encoded in any other promotional media. Consider music videos. Using known TV/computer appliances, watermark data added to such videos can readily be decoded, and used to establish links to audio download, CD-sales, fan club, concert ticket outlet web sites, etc., as above.

Even live events offer such watermark-based opportunities. The analog audio fed to public address or concert speakers can be watermarked (typically before amplification) to encode plural-bit digital data therein. A next generation personal music appliance (e.g. one with a wireless interface to the internet) can include analog record capability (e.g. a built-in microphone, analog-to-digital converter, MP3 encoder, coupled to the unit's semiconductor memory). A user who attends a live event may record an excerpt of the music. The watermark can then be decoded, and the extracted data used to access the links and commerce opportunities reviewed above.

Cinema movies offer both audio and visual opportunities for watermark-based commerce opportunities. Either medium can be encoded to convey information of the types reviewed above. A personal appliance with image- or audio-capture capabilities can capture an excerpt of the audio or imagery, decode the watermark data therefrom, and perform any of the linking, etc., functions reviewed above.

The consumer-interest watermarks reviewed above are only exemplary. Many others will be recognized as useful. For example, promotional clips presented before a feature film presentation can include watermark data that point (either by a literally encoded web address link, or by an ID code that indexes a literal link in a remote link database) to reviewer critiques of the previewed movies. Watermark data in a featured film presentation can lead to web sites with information about the movie stars, the director, the producer, and can list other movies by each of these persons. Other watermark-conveyed web links can present opportunities to buy the movie on videotape, to purchase the movie soundtrack, to buy movie-related toys and games, etc.

More on Device Control

Much of the foregoing has focused on watermark encoding to provide enhanced customer experiences or opportunities. Naturally, watermarks data can alternatively, or additionally, serve the interests of the media owner.

To illustrate, consider watermarked music. The media owner would be best served if the watermark serves dual purposes: permissive and restrictive. Permissively, music appliances can be designed to play (or record) only music that includes an embedded watermark signaling that such activity is authorized. By this arrangement, if music is obtained from an unauthorized source and does not include the necessary watermark, the appliance will recognize that it does not have permission to use the music, so will refuse requests to play (or record).

As noted, music appliances can respond restrictively to the embedded watermark data to set limits on use of the music. Fields in the watermark can specify any or all of (or others in addition to) (a) the types of devices on which the music can be played (b) the types of devices on which the music can be recorded; (c) the number of times the music can be played; (d) the number of times the music can be recorded, etc.

The device restrictions (a) and (b) can be of various types. In some embodiments, the restrictions can identify particular units (e.g. by serial number, registered owner, etc.) that are authorized to play/record the encoded music. Or the restrictions can identify particular classes of units (e.g., battery-powered portable players with music memories of less than 50 megabytes, disk-based dedicated music appliances, general purpose personal computers, etc.) Or the restrictions can identify particular performance quality criteria (e.g., two channel, 16-bit audio at 44.1 KHz sample rate, or lower quality).

The use restrictions (c) and (d) can likewise be of various types. Examples include "do not copy," "copy once only," "unrestricted copying permitted," "play once," "play N times" (where N is a parameter specified elsewhere in the watermarked data, or by reference to a database indexed by a watermark data field), "unrestricted playing permitted," etc.

It is straightforward to design a music appliance to respond to usage limits of zero (e.g. "do not copy") and infinity (e.g. "unrestricted copying permitted," and "unrestricted playing permitted"). The device simply examines one or more bits in the watermark data, and permits (or refuses) an operation based on the value thereof.

Implementation of the other usage-control restrictions can proceed in various ways. Generally speaking, the stored music can be altered to give effect to the usage-control restrictions. For example, if the music is "record-once," then at the time of recording, the appliance can alter the music in a fashion indicating that it now has "do not record" status. This alteration can be done, e.g., by changing the watermark data embedded in the stored music (or adding watermark data), by changing other data stored in association with the music, etc. If the original signal is stored (as opposed, e.g., to a streaming signal, such as an internet or wireless transmission), it too should be so-altered.

Likewise with playback limitations. The number of playbacks remaining can, e.g., be encoded in an updated watermark in the music, be tracked in a separate counter, etc.

More particularly considering the "copy once" usage restriction, an illustrative embodiment provides two distinct watermark payload bits: a "copy once" bit and a "copy never" bit. When originally distributed (whether by internet, wireless, or otherwise), the "copy once" bit is set, and the "copy never" bit is un-set.

When music encoded in this fashion is provided to a compliant recording device, the device is authorized to make one copy. (A compliant device is one that recognizes encoded watermark data, and behaves as dictated by the watermark.) When this privilege is exercised, the recording device must alter the data to ensure that no further copying is possible. In the illustrated embodiment, this alteration is effected by the recording device adding a second watermark to both the music, with the "copy never" bit asserted. The second watermark must generally be encoded in an "orthogonal" domain, so that it will be detectable notwithstanding the continued presence of the original watermark. Compliant equipment must then check for both watermarks, and refuse to copy if either is found to have the "copy never" bit asserted.

One advantage to this arrangement is that if the watermark signal has undergone some form of corruption (e.g. scaling or resampling), the first watermark may have been weakened. In contrast, the second watermark will be native to the corrupted signal, and thus be more easily detected. (The corruption may also contribute to the orthogonality of one watermark relative to the other, since the two watermarks may not have precisely the same time base or other foundation.)

An alternative approach is not to encode the "copy never" bit in the original music, but leave this bit (in whatever manifestation) blank (i.e. neither "1" nor "0"). In transform-based watermark techniques, this can mean leaving transform coefficient(s) corresponding to the "copy never" bit un-changed. If the watermarking is effected in the temporal sample domain (or spatial domain, for image data), this can mean leaving certain samples (pixels) unmodified. The recording device can then alter the transform coefficients and/or samples as necessary to assert the previously-unencoded "copy never" bit when the permitted recording is made.

In such a system, compliant recording devices check for the "copy never" bit in the sole watermark, and refuse to make a copy if it is asserted (ignoring the value of any "copy once" bit).

A third approach to "copy once" is to set both the "copy once" and "copy never" bits, but set the former bit very weakly (e.g. using lower gain and/or high frequency DCT coefficients that do not survive certain processing). The frail "copy once" bit is designed not to survive common corruptions, e.g., resampling scaling, digital to analog conversion, etc. To further assure that the "copy once" bit is lost, the recording device can deliberately add a weak noise signal that masks this bit (e.g. by adding a noise signal in the frequency band whose DCT coefficient conveys the "copy once" bit). In contrast, the "never copy" bit is unchanged and reliably detectable.

In such a system, compliant devices check for the "copy once" bit in the sole watermark, and refuse to make a copy if it is not detected as set.

These three examples are but illustrations of many possible techniques for changing the rights associated with a work. Many other techniques are known. See, e.g., the proposals for watermark-based copy control systems for digital video at the Copy Protection Technical Working Group, http://www.dvcc.com/dhsg/, from which certain of the foregoing examples are drawn. See also Bloom et al, "Copy Protection for DVD Video," IEEE Proceedings, Special Issue on Identification and Protection of Multimedia Information, June, 1999.

Scaleability

One feature that is desirable in many detector embodiments is scaleability. This refers to the ability of a detector to scale its computational demands to match the computational resources available to it. If a detector is running on a high performance Pentium III workstation, it should be "doing more" than if the same detector is running on a slow microcontroller. One way scalability can be achieved is by processing more or less chunks of input data (e.g. temporal excerpts of music, or blocks/macroblocks of pixels in a frame of video data) to decode watermarks. For example, an input audio stream might be broken into chunks of one second each. A fast processor may complete decoding of each chunk in less than a second, permitting it successively to process each chunk in the data stream. In contrast, a slow processor may require two and a half seconds to decode the watermark from a chunk. While it is processing a first chunk, the second and third pass by un-decoded. The processor next grabs and processes the fourth chunk, permitting the fifth and sixth to pass by un-encoded.

The detector running on the fast processor is clearly more difficult to "fool," and yields a decoded watermark of higher confidence. But both systems decode the watermark, and both operate in "real time."

The skipping of input data in the temporal (e.g. music or video) or spatial (e.g. image or video) domain is but one example of how scaleability can be achieved. Many other approaches are known to those skilled in the art. Some of these alternatives rely on spending more or less time in the data analysis phases of watermark decoding, such as cross-correlation operations.

Reference has been made to watermarked UIDs as referring to a database from which larger data strings (e.g. web addresses, musician names, etc.) can be retrieved. In some embodiments, the data record referenced by a UID can, in turn, point to several other database records. By such arrangements, it is often possible to reduce the payload of the watermark, since a single UID reference can lead to several different data records.

Production Tools

In the prior art, the watermark embedded in a source material is typically consistent and static through a work—unchanging from beginning to end. But as will be recognized from the foregoing, there are many applications that are better served by changing the watermark data dynamically during the course of the work. According to another aspect of the invention, a production tool is provided that facilitates the selection and embedding of dynamically-changing watermark data. One such embodiment is a software program having a user interface that graphically displays the different watermark fields that are being embedded in a work, and presents a library of data (textually or by icons) that can be inserted into each field, and/or permits the user to type in data to be encoded. Another control on the UI controls the advance and rewind of the media, permitting the user to determine the location at which different watermark data begins and ends. Graphical paradigms known from video- and audio-editing tools can be used to indicate the starting and ending frames/samples for each different watermark payload.

Such a tool can be of the standalone variety, or can be integrated into the desktop audio- and video-production and editing tools offered by vendors such as Avid, Adobe, Jaleo, Pinnacle Systems, SoundForge, Sonic Foundry, Xing Technology, Prosoniq, and Sonic Desktop Software.

Payment-Based Systems

Another aspect of the present invention is the use of anonymous payment tokens that can be used to obtain content on the web. In one embodiment, a token comprises a 128-bit pseudo-random number, to which additional bits identifying an issuing bank (or other issuing institution) are appended. (The additional bits can be the IP address of a web server of the bank, a routing number identifying the bank for electronic wire transfers, or other identifier.) The 128-bit numbers are randomly generated by the bank—commonly as needed—and each represents a fixed increment of money, e.g. ten cents.

A consumer wishing to have a store of currency for such commerce pays the bank, e.g., $10 in exchange for 100 tokens. These tokens are transferred electronically to disk or other storage in the consumer's computer in response, e.g., to a credit card authorization, or may be provided by diskette or other storage medium over the counter at a bank branch (in which case the consumer thereafter copies the numbers into storage of his or her computer). (Outlets other than banks can of course be employed for distributing such numbers, much in the manner that convenience and many grocery stores commonly issue money orders.)

Imagine that the consumer wishes to view the final quarter of a Trailblazer basketball game that aired on television a week ago. (The consumer may have either missed the game, or may have seen it but wants to see the last quarter again.) The user directs a web browser to a web site maintained for such purpose and performs a search to identify the desired program. (Typically, the web site is maintained by the proprietor that holds the copyright in the material, but this need not be the case. Some material may be available at several web sites, e.g., maintained by ABC Sports, the National Basketball Association, and Sports Illustrated.) The search can use any of various known search engines, e.g., Infoseek, Verity, etc., and can permit searching by title terms, keywords, date of airing, copyright owner, etc. By typing in, e.g., the keyword 'Trailblazers' and the date 'Apr. 26, 1999,' the consumer is presented a listing of videos available for download. One, hopefully, is the requested game. With each listing is an indication of an associated nominal charge (e.g. 80 cents).

On clicking on a hypertext link associated with the desired basketball game, the viewer is presented a further screen with one or more options. The first of the listed options is the entire game, with commercials. The charge is the nominal charge presented on the earlier screen (i.e. 80 cents). Other options may include the first, second, third, and fourth quarters of the game individually, each of which—save the last, costs 20 cents. The last may be charged at a premium rate, e.g., 30 cents. Clicking on the desired video option yields a further screen through which payment is effected.

To pay for the requested video, the consumer instructs his or her computer to transfer three of the earlier-purchased tokens over the web to the video provider. Various user interface metaphors can be employed to facilitate this transfer, e.g., permitting the user to type the amount of money to be transferred in a dialog box presented on-screen, or dropping/dragging icons representing tokens from an on-screen "wallet" to an on-screen "ticket booth" (or over an icon or thumbnail representing the desired content), clicking on an "increment" counter displayed adjacent the listing of the content, etc. Once the consumer has authorized a transfer of sufficient tokens, the consumer's computer sends to the web site (or to such other web address as HTML encoding in the viewed web page may indicate) the tokens. This transmission simply takes the form of the three 128+ bit numbers (the '+' indicating the bank identifier)—in whatever packet or other format may be used by the internet link Once dispatched in this manner, the tokens are deleted from the user's computer, or simply marked as spent. (Of course, in other embodiments, a record of the expenditure may be stored in the consumer's computer, e.g., with the token contents and a record of the audio or video purchase to which they were applied.)

Since the amount of money is nominal, no encryption is provided in this embodiment, although encryption can naturally be provided in other embodiments (e.g., either in sending the tokens from the user to the web site, or earlier, in sending the tokens to the user). As will be seen, provided that the media provider immediately sends the tokens to the bank in real time, encryption is a nice feature but not mandatory On receipt of the token data, the web site immediately routes the token data to the identified bank, together with an identifier of the media provider or account to which the funds represented thereby are to be credited. The bank checks whether the 128-bit numbers have been issued by that bank, and whether they have already been spent. If the numbers are valid, the bank updates its disk-based records to indicate that the three tokens have been spent and that the bank now owes the media supplier 30 cents, which it may either pay immediately (e.g., by crediting to an account identified by the media provider) or as one lump sum at the end of the month. The bank then sends a message to the web site confirming that the tokens were valid and credited to the requested account. (Optionally, a message can be sent to the purchaser of the tokens (if known), reporting that the tokens have been redeemed.)

In response, the web site begins delivery of the requested video to the consumer. In the illustrated embodiment, the video is watermarked prior to delivery, but otherwise sent in unencrypted fashion, typically in streaming format, but optionally in file format. (Encryption can be used in other embodiments.) The watermarking in the illustrated embodiment is accomplished on-the-fly and can include various data, including the date of downloading, the download site, the destination IP address, the identity of the purchaser (if known), etc.

The large size of the video and the small charge assessed therefor provide disincentives for the consumer making illicit copies. (Especially as to archival material whose value decays with time, there is not much after-market demand that could be served by illicit copies, making third party compilation of such material for re-distribution financially unattractive. First run video, and material that keeps a high value over time, would not be as well suited for such distribution, and could better employ technology disclosed elsewhere herein.)

In some embodiments, the integrity of the received video is checked on receipt. This feature is described below in the section entitled Watermark-Based Receipts.

In the illustrative system, nothing in the tokens indicates the identity of the purchaser. The web site knows the IP address of the site to which video was delivered, but need not otherwise know the identity of the purchaser. The bank would probably maintain a record of who purchased the tokens, but need not. In any event, such tokens could thereafter be exchanged among consumers, resulting in anonymity from the bank, if desired.

As described above, the video excerpts from which the consumer can select include commercials. At some sites, video may be provided from which the commercials have been excised, or which is delivered in a manner that skips past the commercials without transmitting same to the consumer. Such video will naturally command a premium price. In some embodiments, the difference in price is electronically credited as compensation to accounts maintained for (or by) the advertisers, whose advertisements are not being viewed by such consumers. (The identification of advertisers to be credited is desirably permanently encoded in the video, either throughout the video (if the video has had the commercials removed therefrom), or by data in the commercials themselves (which commercials are skipped for transmission to the consumer, but can still be decoded at the video head-end. Such encoding can be by in-band watermarking or otherwise.)

While the foregoing discussion particularly considered video as the desired content, the same principles are equally applicable in connection with audio, still imagery, and other content.

The token-based payment method is but one of many that can be employed; the literature relating to on-line payment mechanisms is extensive, and all such systems can generally be here-employed.

Tracking 128-bit tokens can be a logistical problem for the bank. One approach is to have a memory with $10^{128}$ locations, and at each location store a two-bit value (e.g. 00=never issued; 01=issued but not spent; 10=issued and spent; 11=reserved). More complete data could alternatively be stored, but such a memory would be impractically large.

One alternative approach is to hash each 128-bit number, when issued, to a much smaller key value (e.g. 20 bits). A memory with $10^{20}$ locations can be indexed by this key. Each such location can include four data: an issued 128-bit token number that hashes to that value, first and second date fields indicating the date/time on which that token was issued and redeemed, respectively, and a link specifying the address of a next memory location. That next memory location (outside of the original 10.sup.20 locations) can include four more data, this time for a second issued-128-bit token number that hashed to the original key value, two date fields, and again with a link to a subsequent storage location, etc.

When a 128-bit random number is generated, the original memory location indexed by the hash code of that number is checked for an earlier number of the identical value (to avoid issuance of duplicate tokens). Each successive location in the linked chain of memory locations is checked for the same 128-bit number. When the end of the linked chain is reached, the bank knows that the 128-bit random number has not previously been issued, and writes that number in the last-addressed location, together with the date of issuance, and a link to a next storage location.

When a 128-bit token is received, the same linked-list processing occurs to identify a first location, and to thereafter step through each subsequent location until a match is found between the token number and the number stored in one of the linked memory locations. When found, that number is marked as redeemed by writing a redemption date/time in the corresponding field. If the search reaches the end of the linked chain without finding a match between the stored numbers and the token number, the token is treated as invalid (i.e. not issued by that bank).

Other manners of tracking the large number of possible token numbers can of course be used; the foregoing is just exemplary. Or the tokens needn't be tracked at all. Such an arrangement is highly practical if the token has sufficient bits. With the illustrated 128 bits, for example, the chance of two identical tokens being issued is infinitesimally small, so checking for duplicate issuance can be omitted if desired. In such case, the bank can simply maintain an ordered list of the token numbers still outstanding and valid. As new tokens are dispensed, their token numbers are added to the list. As tokens are redeemed, their numbers are deleted from the list. Known list processing techniques can be employed to speed such search, update, and delete actions.

Watermark-Based Receipts

Pay-for-content applications commonly assume that if content is transmitted from a server (or head-end, etc.), it is necessarily received. Sometimes this assumption is wrong. Network outages and interruptions and internet traffic load can diminish (e.g., dropped video frames), or even negate (e.g., failed delivery), expected consumer enjoyment of content. In such cases, the consumer is left to haggle with the content provider in order to obtain an adjustment, or refund, of assessed charges.

Watermarks provide a mechanism for confirming receipt of content. If a watermark is detected continuously during a download or other delivery event, a software program (or hardware device) can issue an electronic receipt attesting that the content was properly delivered. This receipt can be stored, and/or sent to the content distributor to confirm delivery.

In one embodiment, a content receiving device (e.g., computer, television or set-top box, audio appliance, etc.) periodically decodes a watermark from the received content to confirm its continued reception. For example, every five seconds a watermark detector can decode the watermark and make a record of the decoded data (or simply record the fact of continued detection of the same watermark). When a changed watermark is detected (i.e., reception of a different content object begins), the duration of the previously-received content is logged, and a receipt is issued.

In a related embodiment, the last portion (e.g., 5 seconds, frame, etc.) of the content bears a different "end of content" watermark that triggers issuance of a receipt. Such a watermark can indicate the length of the content, to serve as a cross-check against the periodic watermark polling. (E.g., if periodic sampling at 2 second intervals yields 545 samples corresponding to the same content, and if the "end of content" watermark indicates that the content was 1090 seconds long, then receipt of the entire content can be confirmed.)

In another embodiment, the watermark can change during the course of the content by including, e.g., a datum that increments every frame or other increment of time (e.g., frame number, time stamp, etc.). A watermark detector can monitor the continued incrementing of this datum throughout the content to confirm that no part was garbled (which would destroy the watermark) or was otherwise missing. Again, at the end of delivery, the receiving system can issue a confirmation that XXX frames/seconds/etc. of the identified content were received.

One application of such technology is to bill for content based on receipt, rather than transmission. Moreover, billings can be adjusted based on percentage of content-value received. If delivery is interrupted mid-way through (e.g., by the consumer disabling the content-receiving device), the nominal billing for the content can be halved. Some prolonged content, e.g., televised/web-broadcast university classes, cannot be "consumed" in one session, and are thus particularly well suited for such pay-as-you-consume billing Another application of such technology is in advertising verification. Presently, ads are tracked by transmission or, less frequently, by detection of an embedded code on receipt (c.f., Nielsen Media Research's U.S. Pat. Nos. 5,850,249 and 5,737,025). However, such reception-detectors—once triggered—generally do not further note the length of time that the advertising was received, so the same data is produced regardless of whether only five or fifty seconds of a commercial is presented. Watermark monitoring as contemplated herein allows the duration of the advertising impression to be precisely tracked.

In one application of this technology, recipients of advertising are provided incentives for viewing advertising in its entirety. For example, a content-receiving device can include a watermark detector that issues a receipt for each advertisement that is heard/viewed in its entirety. These receipts can be redeemed, e.g., for content tokens as described elsewhere herein, for monetary value, etc. In some embodiments, receipts are generic and can all be applied to a desired premium, regardless of the advertisements through which they were earned. In other embodiments, the receipts are associated with the particular advertisers (or class of advertisers). Thus, a TV viewer who accumulates 50 receipts from advertising originating from Procter & Gamble may be able to redeem same for a coupon good for $2.50 off any Procter & Gamble product, or receipts from Delta Airlines may be redeemed for Delta frequency flier miles (e.g., at a rate of one mile per minute of advertising). Such incentives are particularly useful in new forms of media that give the consumer enhanced opportunities to fast-forward or otherwise skip advertising.

(Although the foregoing "receipt" concept has been described in conjunction with watermark data (and use of watermark technology is believed to be inherently advantageous in this application), the same principles can likewise be implemented with ancillary data conveyed by other means.)

Master Global Address

As suggested above, it is desirable that each piece of content have a web address (the "Master Global Address"

(MGA), or "Master IP Address") associated with it. Such address is typically conveyed with the content, e.g., by an IP address watermarked therein.

Consider a consumer who downloads a streaming video having an English language soundtrack. The viewer may not speak English, or may otherwise prefer to listen to the soundtrack in another language. The user can decode the watermark data embedded in the video and initiate a link to the associated web address. There the user is presented with a list of soundtracks for that content object in other languages. The viewer can click on the desired language and receive same via a second simultaneous transmission (e.g., a second socket channel). The consumer's audio/video appliance can substitute the desired audio track for the default English track.

If the streaming video and the alternative soundtrack are hosted on the same server, synchronization is straightforward. The process governing transmission of the alternative soundtrack identifies the process that is streaming video to the same IP address. Based on SMPTE, or other time/frame data, the former process syncs to the latter. (If the two data streams don't originate through the same server, time/frame data can be relayed as necessary to the alternative soundtrack server to effect synchronization.)

Another application of the Master Global Address is to serve as a point to which monitoring stations can report the presence, or passage, of content. Consider, for example, a copyright-aware node through which content signals pass, e.g., a computer node on a network, a satellite transponder, etc. Whenever the node detects passage of a media object (e.g., by reference to a file extension, such as MP3, JPG, AVI, etc.), it sends a "ping" over the internet to the address encoded in the object, simply reporting passage of the object. Similar monitoring facilities can be provided in end user computers, e.g., reporting FileOpen, FileSave, Printing, or other use of content bearing MGA data.

This system can be expanded to include "ping" and "pong" phases of operation. When a software application (or a user appliance, such as a video or audio playback device) encounters a media object (e.g., at time of file open, at time of playback, etc.), it pings the MGA site to report the encounter. The MGA site "pongs" back, responding with instructions appropriate to the encounter. For example, if the object requires payment of a fee before full functionality or access is to be granted, the MGA site can respond to the application with instructions that the object be used (e.g., played back) only in some crippled state preventing the user's full enjoyment (e.g., impaired resolution, or impaired sound quality, or excerpts only, etc.). The MGA site can also inform the user application of the terms (e.g., payment) by which full functionality can be obtained. The application can graphically or audibly present such information to the user, who can authorize a payment, if desired, so that the content can be enjoyed in a less- (or un-) crippled state. On receipt of the payment authorization, the MGA site can inform the user application that enhanced access/usage rights have been purchased, and that the application may proceed accordingly.

Yet another application of the MGA is to present the user of a content object a menu of options that is customized to that object.

In current graphical operating systems, when a user clicks on an icon (e.g., with the right mouse button), a menu is presented detailing actions that can be undertaken in connection with the icon, or the file represented thereby. Such options are pre-programmed (i.e., static), and are typically determined by the operating system based solely on the file extension.

In accordance with this aspect of the present invention, clicking on an icon representing a media object initiates an internet link to the MGA site associated with the object. The MGA site responds with data that is used to customize the menu of options presented to the user in connection with that particular object.

Consider an icon representing a JPG image file. Right-clicking on the icon may yield a menu that gives the user various options presented by the operating system (e.g., delete, compress, rename), and additional options customized in accordance with data from the object's MGA site. These customized options may include, e.g., [0424](a) open in 100.times.150 pixel format for free; [0425](b) open in 480.times.640 pixel format for ten cents; [0426](c) open in 960.times.1280 pixel format for twenty cents; [0427](d) purchase rights to use this image in a newsletter having a circulation of under 1000 for $1.25; [0428](e) display a complete listing of license options.

Clicking on options (b) or (c) initiates a commerce application through which funds are electronically transferred to the MGA site (by the above-described tokens or otherwise). In response, the MGA site responds (e.g., with TCP/IP or HTML instructions) authorizing an application on the user's computer to open the file in the requested manner. (The default application for JPG applications can then automatically be launched, or the computer may first query the user whether another application should be used instead.)

Clicking on option (d) proceeds as above, and permits full use of the image on the computer. Moreover, the MGA site sends a digital certificate to the user's computer memorializing the usage rights purchased by the consumer.

In this particular arrangement, no access control is placed on the content, e.g., by encryption, secure container technology, or the like. The nominal fees, and the ease of licensing, make it simple for the user to "do the right thing" and avoid copyright liability. In other embodiments, of course, known access control techniques can be used to limit use of the object until the requisite payment has been made.

Naturally, records of all such transactions are also logged at the MGA site.

Clicking on option (e) opens a browser window on the user's computer to a web site that presents a complete listing of license options available for that image. (The address of this web site is included in customization data relayed to the user device from the MGA site, but not explicitly shown to the user on the menu.) Through such web site, the user can select desired rights, effect payment, and receive the necessary authorization for software applications on the user's computer (or other media appliance) to open and/or process the content.

The object on which the user "clicks" needn't be an icon. It can be an image or other graphical representation. (And a "click" isn't necessary; a voice command or other signal may be used to the same effect with an audio clip or selection.)

Consider the popular merchandising of books and CDs over the internet. A JPG or other image file depicting the cover of a book, or the artwork of a CD cover, can be treated as a media object, and can include a watermarked MGA pointer. Right-clicking on such an image of a book cover could, through the MGA site, present to the user a menu of options that includes—in addition to those normally presented in conjunction with a JPG file—the following: [0436](a) "See the review of this book published in the New York Times on Apr. 19, 1999" [0437](b) "See the list of reviews of this book at Amazon.com" [0438](c) "Enter your own review of this book, for posting on Amazon.com" [0439](d) "See today's sales rank of this book at Amazon.com" [0440](e) "Purchase this book from Amazon.com for $16.95" [0441](f) "Purchase this book from Barnesandnoble.com for $19.95 and receive a $5.00 credit towards your next purchase" [0442](g) "Link to the web site that tells about the release of this title as a motion picture (presently scheduled to open on Oct. 10, 1999)" [0443](h) "Link to the Yahoo listing of web sites relating to this book" [0444](i) "Search Lycos for listings relating to this book."

If the user selects one of the purchase options from the menu, a pre-stored e-commerce profile—containing the user name, credit card number, billing address, ship-to address, etc., possibly in the form of an encrypted object—could be sent to the MGA site (or to the bookseller) to effect the purchase, or such selection could initiate display of additional screens or sub-menus through which the user would manually enter or select such information for transmission.

Others of the selections cause a new browser window to open on the user's computer, opening to a URL specified in data relayed from the MGA site but not displayed to the user in the menu. Appropriate HTML instructions can be generated to effect a particular query or other operation at the specified URL.

In some embodiments, the customized menu presents only a single choice in addition to those normally provided by the operating system, e.g., "Link to home." Clicking on this option opens a browser window to a home page at the MGA for that object. On that page, the user is presented with all of the foregoing options, and more (possibly including advertising graphics or multi-media). Such objects can serve as powerful marketing agents. Returning to the example discussed above, a JPG image file of a book cover may have, as its MGA, a web page hosted by a particular bookseller, providing purchase options and other information for that book. Marketing of books (or CDs, or cars, or consumer appliances, or virtually anything else) can be effected by disseminating such vendor-issued JPGs as widely as possible. Some book cover JPGs may be distributed by Amazon.com, others by Barnes&Noble.com, others by Borders.com—each pointing back to a different MGA through which purchase transactions for that book may be performed.

Returning to the MGA-customized menus, these needn't be limited to menus resulting from clicking on an icon or image (or signaling during an audio excerpt). Drop-down menus in application programs can likewise be populated with customized options, in accordance with customization data obtained from the MGA site for the object presently being accessed or used. Most graphical operating systems and application programs have well developed toolsets permitting such menu customization. Again, other data relayed from the MGA site is not shown to the user, but is employed by the computer (e.g., a browser program) to carry out menu options selected by the user.

Again the foregoing techniques are equally applicable for still images, audio, video, and other forms of content, and can readily be adapted for use both with general purpose computers, software applications, and specialized media appliances.

While, for expository convenience, the foregoing discussion contemplated embedding a literal URL address in the object as the MGA, more typically this is not the case. Instead, the MGA more commonly comprises identification data for the object (e.g. a 128-bit random ID), together with the URL for a name server computer that serves many (perhaps millions) of such objects (an example of the latter is the Digimarc MarcCentre server).

To obtain the desired data as detailed above, the user's computer (sometimes termed a client computer) links to the name server computer and provides the ID of the object being processed. The name server computer uses this ID to query a database, and obtains from the database the current IP address to which such queries should be routed. The name server computer can relay the request from the client computer to the correct destination address, or can return the correct destination address to the client computer, which can initiate such a link itself. By such arrangement, the IP address ultimately associated with an object can be easily changed as needed, simply by changing the corresponding record in the name server database, without rendering obsolete legacy objects having out-of-date addresses encoded therein.

In some embodiments, the URL of the name server needn't be included in the watermark. In the absence of a specified URL, the client computer may direct such links to a default name server address instead (stored locally or remotely). If that server doesn't recognize the object ID, it can return an error code, or pass the query on to other name servers. Those servers, in turn, can pass the query along to still other name servers if they don't recognize the object ID. In this fashion, an exponentially-large number of name servers might be quickly polled for information relating to the identified object. Alternatively, rather than encoding the complete IP address of the name server in an object watermark, the first N (e.g., 16) bits of the object ID might be used as a short-hand for one of 65,536 predetermined name server addresses, in accordance with data stored locally (e.g., on RAM or disk in the user's computer) or remotely (e.g., at a default name server IP address).

While the basic concept idea behind embedding MGA data within an object is to point to a repository of data about the object, a pointer the other way may be achieved as well.

As noted, the "ping" application of MGA data permits an MGA site to be informed of sites through which its object passes. More generally, the MGA site can log the originating address of each query it receives. Each such address can be presumed to have (or have had) a copy of the corresponding object. Media owners can thereby track the dissemination of copies of their media objects—at least insofar as use of such objects entails communicating with the associated MGA site.

Such tracking offers a great number of opportunities, some in the area of commerce. The MGA site corresponding to the cover art of a Garth Brooks CD, for example, can provide a listing of IP addresses of persons interested in that CD. Email or promotional data objects (e.g., audio clips) can be sent to that list of addresses when a subsequent Garth Brooks CD is released.

Such tracking also opens up a new dimension of internet searching. Presently, internet search engines use a brute force approach, visiting millions of pages across the web in order to identify, for example, a dozen instances of a given photograph file. MGAs offer a shortcut to such brute force approaches. With the present technology, a search engine can find a single instance of a photograph file and, by detection of the MGA data watermarked therein, link to the corresponding MGA site. From the MGA site, the search engine can obtain a listing (if such queries are authorized) of some or all of the other sites known by the MGA site to have copies of that photograph file. (Providing such data to search engines is a commerce opportunity for such MGA sites, which may permit such access to its listing of sites only in exchange for a fee. Or the MGA site may arrange to collect a tribute payment from the search engine proprietor each time the engine responds to a user query using data collected from the MGA site.)

Many of the addresses logged by the MGA may not be publicly-accessible data stores. The search engine can check each listed address to ensure that the desired object is present and accessible before adding the address to its database.

Covert Tracing

Co-pending application Ser. No. 09/185,380 (now U.S. Pat. No. 6,549,638) describes anti-counterfeiting technology that looks for the presence of digital data corresponding to bank note imagery in a computer system, and makes a covert record of any attempt to process such data (e.g., Scan, File-Open, FileSave, Print, Edit, etc.). Such records are hidden from the user of the system (using, e.g., various data encryption and obscuring techniques), but authorized law enforcement officials are provided tools by which these records can be recovered. The forensic data thereby obtained may prove useful in prosecuting counterfeiters. (Knowledge that a computer may be covertly storing evidence of attempted counterfeiting actions may prove as, or more, valuable in deterring counterfeiting than the covert records themselves.)

The same techniques can be employed to deter unauthorized processing of audio, image, video, or content by media pirates. In one embodiment, a computer's operating system (including peripheral device drivers) monitors various data within the system (e.g., data sent to writeable storage media, or sent via a serial port or network connection, etc.) for data bearing a do-not-copy watermark. The presence of such data being sent, e.g., to a writeable disk or to a remote computer, indicates that the do-not-copy instruction has been circumvented. In such case, the operating system writes one or more covert records memorializing the activity, for possible use in criminal prosecution if the computer is lawfully seized.

The example just-provided is but one of many monitoring and response techniques that may be employed to deter circumvention of copy-protection or other access control systems. Generally speaking, if content data is found where it shouldn't be, or is found used as it shouldn't be used, a corresponding record should be made. (Other intervention actions can be triggered as well; covert tracing is desirably just one of several parallel responses to suspected hacking.)

Meta-Data Accessed Using Watermarks

Meta-data, in formats known as XML, SGML, and HTML, is widely used to communicate information about digital objects (e.g., author, keywords, price, rights, caption, etc.). More generally, meta-data can be thought of as any data construct which associates the name of a property (e.g., "author), with the value of the property (e.g., "Mark Twain"). Such data commonly appears in a tag format, such as the following: [0464]<META NAME="author" CONTENT="Mark Twain">

Meta-data is commonly exchanged between server and client computers in conjunction with the digital objects to which they relate (e.g., the text of a Mark Twain book).

As detailed herein, an important application of watermarking is likewise to convey information about media—in this case embedded within the media content itself (e.g., providing unique identification, establishing some basic behaviors such as do not copy, and providing links to extended functionality).

For meta-data to be useful, it must be linked to associated content, whether in the context of a browser, application program, operating system, asset management system, search engine, etc. However, as detailed below, the content and the associated meta-tags needn't always be conveyed together.

Consider an application program or other client process that receives a watermarked media object. The watermark includes an MGA for that object (which, as noted above, may not specify an ultimate IP address). Stored at the MGA site is meta-data corresponding to the object. By linking to the MGA site identified by the object's watermark, the client computer can obtain the meta-data corresponding to the object. This data can be stored at the client computer and used just as any other meta-data, e.g., to define the local functions that should be available for use with that object (e.g., buy, search, etc.)

A particular example is an on-line catalog of stock photography. Each photograph is watermarked with MGA data. To identify the photographer, copyright date, price, telephone number, subject, etc., an application program can link to the MGA site for that photograph, and obtain the corresponding meta-data. This data can then be displayed or used as needed. Data objects of disparate formats thus can readily be handled within a single, simple application program, since the program needn't concern itself with the varying formats for the associated meta-data (assuming the name servers provide this data in standardized format). Substantial flexibility in programming and object formatting is thereby achieved.

Returning to the internet search engine example described above, MGAs may become recognized as repositories rich in meta-data for media objects. Specialized search engines may focus their data collection around such sites, and be able to quickly identify the MGA sites corresponding to various boolean combinations of meta-tag parameters.

Asset Management/Containers

Much has been written on the topic of asset rights management. Sample patent documents include U.S. Pat. Nos. 5,892, 900, 5,715,403, 5,638,443, 5,634,012, 5,629,980 and laid-open European application EP 862,318. Much of the technical work is memorialized in journal articles, which can be identified by searching for relevant company names and trademarks such as IBM's Cryptolope system, Portland Software's ZipLock system, the Rights Exchange service by Softbank Net Solutions, and the DigiBox system from InterTrust Technologies.

An exemplary asset management system makes content available (e.g. from a web server, or on a new computer's hard disk) in encrypted form. Associated with the encrypted content is data identifying the content (e.g. a preview) and data specifying various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Desirably, the content should be marked (personalized/serialized) so that any illicit use of the content (after decryption) can be tracked. This marking can be performed with watermarking, which assures that the mark travels with the content wherever—and in whatever form—it may go. The watermarking can be effected by the distributor—prior to dissemination of the encrypted object—such as by encoding a UID that is associated in a database with that particular container. When access rights are granted to that container, the database record can be updated to reflect the purchaser, the purchase date, the rights granted, etc. An alternative is to include a watermark encoder in the software tool used to access (e.g. decrypt) the content. Such an encoder can embed watermark data in the content as it is released from the secure container, before it is provided to the user. The embedded data can include a UID. This UID can be assigned by the distributor prior to disseminating the container. Alternatively, the UID can be a data string not known or created until access rights have been granted. In addition to the UID, the watermark can include other data not known to the distributor, e.g. information specific to the time(s) and manner(s) of accessing the content.

As noted earlier, access rights systems can be realized with watermarks without containers etc. For example, in a trusting world, copyrighted works can be freely available on the web. If a user wishes to make lawful use of the work, the user can decode its watermark to determine the work's terms and conditions of use. This may entail linking to a web site specified by the embedded watermark (directly, or through an intermediate database), which specifies the desired information. The user can then arrange the necessary payment, and use the item knowing that the necessary rights have been secured.

Remote Reconfiguration of Watermark Detectors

In some cases, it is desirable to reconfigure watermark detectors remotely. Such functionality is desirable, for example, if a watermark system is hacked or otherwise compromised.

In accordance with this aspect of the present invention, some aspect of a watermark detector's operation is changed in response to a command. The change can take various forms. In watermark systems employing pseudo-random key data (e.g., spread spectrum spreading signals), the pseudo-random signal used for detection can be changed. In systems using DFT processing, the mapping between message bits and DFT coefficients can be changed. In still other systems, the decoding can proceed as before, but the significance of one or more bits can be changed (e.g., bits that were normally interpreted as defining Field A can be interpreted as defining Field B, and vice versa). In yet other systems, the decoding can proceed as before, but the response of a device to a given watermark signal can be changed. In still other systems, a set of software instructions can be re-written or re-ordered to effect a change in detector operation.

The command can be conveyed in various ways. In one embodiment, it can be a trigger bit in the watermark payload. Normally the bit has a value of "0." If the bit has a value of "1," the detector system responds by changing its operation. A trigger pattern can also be established, so that detection of a certain combination of bits in the watermark payload serves to trigger the change. Reserved states of certain data fields are examples of patterns that might be employed.

The command can also be conveyed through another channel different than the watermark channel (e.g., an SCA channel of an FM broadcast, or the sub-titling data channel of video broadcasts, or header data within an MPEG data stream, etc., etc.).

The change can proceed in accordance with a pre-programmed rule (e.g., codes progressing successively through a numerically or algorithmically-determined progression), or the change can proceed in accordance with data specified elsewhere in the payload of the watermark bearing the trigger bit (e.g., instead of being interpreted in normal fashion, the non-trigger bits of the detected watermark can define a new pseudo-random key data. Or the change can proceed in accordance with data conveyed in successively-presented watermark payloads, as might be done in video encoding where each frame of video can convey further watermark information. (This latter arrangement is one offering a high-bandwidth re-programming channel through which, e.g., extensive firmware instructions might be transferred to the detector to replace instructions earlier stored.)

By such arrangements, greatly increased detector versatility and functionality can be achieved.

Conclusion

Many diverse embodiments are reviewed above—each with a unique set of features. (Still others are disclosed in the assignee's patents incorporated by reference.) This specification should be construed as explicitly teaching that features illustrated in one such embodiment can generally be used in other embodiments as well. Thus, for example, a date field was not particularly discussed in connection with payload data for video watermarking. Nor were "play once" watermarks so-considered. The inclusion of a calibration signal with (or as part of) the watermark is shown in embodiments of the issued patents, but is not belabored in the above-described embodiments. Likewise with "simple universal codes." The pre-stored commerce profile described in one of the foregoing embodiments is equally applicable to other embodiments as well. Likewise, the presentation of advertising was discussed in connection with one embodiment but not others, although it, too, is generally applicable. All of these concepts are familiar at Digimarc and are regarded as generally applicable throughout the work expressed in Digimarc's patent disclosures. Practicality prevents an exhaustive recitation of each individual permutation and combination.

Having described and illustrated the principles of our invention with reference to illustrative embodiments, it will be apparent that the detailed arrangements can be modified in arrangement and detail without departing from such principles.

For example, while reference has been made to various uses of wireless, it should be understood that such reference does not just cover FM broadcast, and wireless internet networking and the like, but also includes other wireless mechanisms. Examples include cell phones and direct satellite broadcast.

Likewise, while certain embodiments were illustrated with a watermark payload of 100+ bits, in other systems much smaller (or sometimes larger) payloads are desirable—sometimes as small as 1-8 bits.

While the foregoing examples have each been illustrated with reference to a particular media type (e.g., video, audio, etc.), it will be recognized that the principles of each embodiment find application with the other media types as well.

Certain of the appliances contemplated above require user interfaces more sophisticated than are presently typical on such devices. The simplicity of the underlying audio appliance can be preserved, in many instances, by using a palmtop computer—coupled by infrared or otherwise—as a temporary user interface to the appliance. Some of the processing capability can likewise be off-loaded to an ancillary palmtop. (Palmtop is here meant to refer generally to any pocket-size programmable computing device.)

Unless otherwise stated, it should be understood that the digital music, video, and imagery contemplated herein is not of any particular form or format. Audio, for example, can be of various forms, both streaming and non-streaming, and of various formats (e.g. MP3, MP4, MS Audio, Windows Media Technologies, RealAudio, *.WAV, MIDI, Csound, Dolby's Advanced Audio Codec (AAC), etc.

To provide a comprehensive disclosure without unduly lengthening the present specification, applicants incorporate by reference the patent publications and applications cited herein.

What is claimed is:

1. A method comprising:
   capturing image data corresponding to an object, using a camera of a computing device, wherein the object does not include visible digital encoding;
   providing at least some of the image data to a processor;
   receiving, from the processor, processed information corresponding to the object and based on the at least some of the image data;
   identifying, by reference to the processed information, a particular one of plural different software application programs or routines, wherein the identified software application program or routine is particularly relevant to the object, and wherein the identified software application program or routine is not generally relevant to all objects;

producing output information, using the identified software application program or routine; and presenting the output information using an output component of the computing device.

2. The method of claim 1, wherein the computing device has plural different software application programs or routines stored thereon, and wherein the identifying comprises identifying a particular one of said software application programs or routines stored on the computing device.

3. The method of claim 1, wherein the identifying comprises consulting a data structure in a memory of the computing device, wherein the data structure in the memory of the computing device comprises the plural different software application programs or routines.

4. The method of claim 1, further comprising operating the camera in a mode wherein the camera is continuously capturing a sequence of image frames, and wherein the at least some of the image data provided to the processor corresponds to an image frame from the sequence.

5. The method of claim 1, further comprising processing the at least some of the image data to derive the processed information therefrom.

6. The method of claim 1, further comprising applying plural different processes to the at least some of the image data to try and find a process that yields processed information that is valid.

7. The method of claim 1, further comprising processing the at least some of the image data with a digital watermark decoding process to derive the processed information.

8. The method of claim 1, wherein the providing comprises providing the at least some of the image data to a processor remote from the computing device.

9. The method of claim 1, wherein the object is printed with artwork intended for viewing by a viewer, wherein the artwork comprises steganographically encoded information.

10. A method comprising:

capturing image data corresponding to an object, using a camera of a computing device, wherein the object does not include visible digital encoding;

providing at least some of the image data to a processor;

receiving, from the processor, processed information corresponding to the object and based on the at least some of the image data;

identifying, by reference to the processed information, two or more different software application programs or routines, wherein the identified software application programs or routines are particularly relevant to the object, and wherein the identified software application programs or routines are not generally relevant to all objects;

presenting information to a user inviting the user to select one of said two or more identified software application programs or routines;

receiving information about a selection from the user;

producing output information using the selected software application program or routine; and presenting the output information using an output component of the computing device.

11. The method of claim 10, wherein the computing device has plural different software application programs or routines stored thereon, and wherein the identifying comprises identifying particular ones of said software application programs or routines stored on the computing device.

12. The method of claim 10, wherein the identifying comprises consulting a data structure in a memory of the computing device, wherein the data structure in the memory of the computing device comprises the plural different software application programs or routines.

13. The method of claim 10, further comprising operating the camera in a mode wherein the camera is continuously capturing a sequence of image frames, and wherein the at least some of the image data provided to the processor corresponds to an image frame from the sequence.

14. The method of claim 10, further comprising processing the at least some of the image data to derive the processed information therefrom.

15. The method of claim 10, further comprising applying plural different processes to the at least some of the image data to try and find a process that yields processed information that is valid.

16. The method of claim 10, further comprising processing the provided image data with a digital watermark decoding process to derive the processed information.

17. The method of claim 10, wherein the providing comprises providing the at least some of the image data to a processor remote from the computing device.

18. The method of claim 10, wherein the object is printed with artwork intended for viewing by a viewer, and wherein the artwork comprises steganographically encoded information.

19. A non-transitory computer-readable medium having instructions comprising:

instructions to capture image data corresponding to an object using a camera;

instructions to provide at least some of the image data to a processor;

instructions to process the at least some of the image data to produce processed information corresponding to the object;

instructions to identify, by reference to the processed information, a particular one of plural different software application programs or routines stored in a data store, wherein the identified software application program or routine is particularly relevant to the object, and wherein the identified software application program or routine is not generally relevant to all objects;

instructions to use the identified software application program or routine to produce output information; and instructions to present the output information.

20. A method comprising:

operating a camera of a computing device in a mode in which it captures a sequence of image frames in an automated, on-going fashion, wherein at least one of the frames depicts a scene;

providing at least some image data corresponding to the at least one of the frames to a processor;

receiving, from the processor, processed information corresponding to the scene and based on the provided image data;

identifying, by reference to the processed information and a data structure in the computing device containing reference information, a particular one of plural different software application programs or routines, wherein the identified software application program or routine is particularly relevant to a subject depicted in the scene, wherein the identified software application program or routine is not generally relevant to all subjects, wherein the identifying is performed without consulting a remote data structure, and wherein the subject is free of inked or other printed markings;

executing the identified software application program or routine; and providing response data to a user based on an output from execution of the identified software application program or routine.

21. A method comprising:

capturing image data corresponding to a scene, using a camera of a computing device;

providing at least some of the image data to a processor;

receiving, from the processor, processed information corresponding to the scene and based on the at least some of the image data;

identifying, by reference to the processed information, a particular one of plural different sets of software instructions, wherein the identified set of software instructions are particularly relevant to a subject depicted in the scene, and wherein the identified set of software instructions are not generally relevant to all subjects; and executing the identified set of software instructions, wherein execution of the identified set of software instructions involves further processing of the image data.

22. A non-transitory computer-readable medium having instructions comprising:

instructions to process image data corresponding to an image scene captured by a camera to produce processed information;

instructions to identify, by reference to the processed information, a particular one of plural different sets of software instructions, wherein the identified set of software instructions are particularly relevant to a subject depicted in the scene, and wherein the identified set of software instructions are not generally relevant to all subjects; and instructions to execute the identified set of software instructions, wherein the execution involves further processing of image data captured by the camera.

23. An apparatus comprising:

a camera configured to capture image data corresponding to an object;

a data store configured to store a plurality of software application programs and routines;

a processor configured to:

process the at least some of the image data to produce processed information corresponding to the object;

identify, by reference to the processed information, a particular one of the plural software application programs and routines, wherein the identified software application program or routine is particularly relevant to the object, and wherein the identified software application program or routine is not generally relevant to all objects; and use the identified software application program or routine to produce output information; and a display configured to present the output information.

24. A non-transitory computer-readable medium having instructions comprising:

instructions to capture image data corresponding to an object, using a camera, wherein the object does not include visible digital encoding;

instructions to generate processed information corresponding to the object and based on the at least some of the image data;

instructions to identify, by reference to the processed information, two or more different software application programs or routines, wherein the identified software application programs or routines are particularly relevant to the object, and wherein the identified software application programs or routines are not generally relevant to all objects;

instructions to present information to a user inviting the user to select one of said two or more identified software application programs or routines;

instructions to receive information about a selection from the user;

instructions to produce output information using the selected software application program or routine; and instructions to present the output information using an output component of the computing device.

25. An apparatus comprising:

a camera configured to capture image data corresponding to an object, wherein the object does not include visible digital encoding;

a processor configured to:

receive at least some of the image data to a processor;

generate processed information corresponding to the object and based on the at least some of the image data; and identify, by reference to the processed information, two or more different software application programs or routines, wherein the identified software application programs or routines are particularly relevant to the object, and wherein the identified software application programs or routines are not generally relevant to all objects;

a display configured to present information to a user inviting the user to select one of said two or more identified software application programs or routines;

the processor further configured to:

receive information about a selection from the user; and produce output information using the selected software application program or routine; and the display further configured to present the output information.

26. A non-transitory computer-readable medium having instructions comprising:

instructions to operate a camera in a mode in which it captures a sequence of image frames in an automated, on-going fashion, wherein at least one of the frames depicts a scene;

instructions to provide at least some image data corresponding to the at least one of the frames to a processor;

instructions to receive, from the processor, processed information corresponding to the scene and based on the provided image data;

instructions to identify, by reference to the processed information and a data structure in the computing device containing reference information, a particular one of plural different software application programs or routines, wherein the identified software application program or routine is particularly relevant to a subject depicted in the scene, wherein the identified software application program or routine is not generally relevant to all subjects, wherein the identifying is performed without consulting a remote data structure, and wherein the subject is free of inked or other printed markings;

instructions to execute the identified software application program or routine; and instructions to provide response data to a user based on an output from execution of the identified software application program or routine.

27. An apparatus comprising:
a camera configured to capture a sequence of image frames in an automated, on-going fashion, wherein at least one of the frames depicts a scene;
a processor configured to:
generate processed information corresponding to the scene and based on the provided image data;
identify, by reference to the processed information and a data structure in the computing device containing reference information, a particular one of plural different software application programs or routines, wherein the identified software application program or routine is particularly relevant to a subject depicted in the scene, wherein the identified software application program or routine is not generally relevant to all subjects, wherein the identifying is performed without consulting a remote data structure, and wherein the subject is free of inked or other printed markings; and
execute the identified software application program or routine; and
a display configured to provide response data to a user based on an output from execution of the identified software application program or routine.

28. An apparatus comprising:
a camera configured to capture an image scene,
a processor configured to:
process image data corresponding to the image scene to produce processed information;
identify, by reference to the processed information, a particular one of plural different sets of software instructions, wherein the identified set of software instructions are particularly relevant to a subject depicted in the scene, and wherein the identified set of software instructions are not generally relevant to all subjects; and
execute the identified set of software instructions, wherein the execution involves further processing of image data captured by the camera.

29. A method comprising:
capturing image data corresponding to an object, using a camera;
generating processed information corresponding to the object and based in part on the image data;
identifying, by reference to the processed information, an application; and
executing the application.

30. The method of claim 29, further comprising operating the camera in a mode wherein the camera is continuously capturing a sequence of image frames, and wherein at least some of the image data corresponds to an image frame from the sequence.

31. The method of claim 29, wherein the generating processed information comprises decoding a digital watermark within the image data.

32. The method of claim 29, wherein the generating processed information comprises:
applying multiple different processes to the image data; and
determining if a different process generates valid processed information.

33. The method of claim 29, further comprising presenting output information from the executed application.

34. An apparatus comprising:
a camera configured to capture image data corresponding to an object; and
a processor configured to:
generate processed information corresponding to the object and based in part on the image data;
identify, by reference to the processed information, an application; and
execute the application.

35. The apparatus of claim 34, wherein the camera is further configured to operate in a mode wherein the camera is continuously capturing a sequence of image frames, and wherein at least some of the image data corresponds to an image frame from the sequence.

36. The apparatus of claim 34, wherein the processor is configured to decode a digital watermark within the image data to generate processed information.

37. The apparatus of claim 34, wherein the processor is configured to:
apply multiple different processes to the image data; and
determine if a different process generates valid processed information to generate processed information.

38. The apparatus of claim 34, wherein the processor is further configured to present output information from the executed application.

39. A non-transitory computer-readable medium having instructions comprising:
instructions to capture image data corresponding to an object; and
instructions to generate processed information corresponding to the object and based in part on the image data;
instructions to identify, by reference to the processed information, an application; and
instructions to execute the application.

40. The non-transitory computer-readable medium of claim 39, wherein the instructions further comprise instructions to operate continuously capture a sequence of image frames, and wherein at least some of the image data corresponds to an image frame from the sequence.

41. The non-transitory computer-readable medium of claim 39, wherein the instructions further comprise instructions to decode a digital watermark within the image data to generate processed information.

42. The non-transitory computer-readable medium of claim 39, wherein the instructions further comprise instructions to:
apply multiple different processes to the image data; and
determine if a different process generates valid processed information to generate processed information.

43. The non-transitory computer-readable medium of claim 39, wherein the instructions further comprise instructions to present output information from the executed application.

* * * * *

UNITED STATES PATENT AND TRADEMARK OFFICE
CERTIFICATE OF CORRECTION

PATENT NO.       : 8,256,665 B2
APPLICATION NO.  : 12/953190
DATED            : September 4, 2012
INVENTOR(S)      : Rhoads It is certified that error appears in the above-identified patent and that said Letters Patent is hereby corrected as shown below:

In Column 4, Line 24, delete "an 10" and insert -- a 10 --, therefor.

In Column 13, Line 29, delete "barrista." and insert -- barista. --, therefor.

In Column 19, Line 15, delete "rotation" and insert -- rotation. --, therefor.

In Column 33, Line 57, delete "example)" and insert -- example). --, therefor.

In Column 35, Line 47, delete "by found" and insert -- be found --, therefor.

In Column 36, Line 60, delete "link" and insert -- link. --, therefor.

In Column 41, Line 57, delete "non-volative" and insert -- non-volatile --, therefor.

In Column 42, Lines 55-56, delete "applicance" and insert -- appliance --, therefor.

In Column 43, Line 36, delete "billing" and insert -- billing. --, therefor.

In Column 49, Line 51, delete "mandatory" and insert -- mandatory. --, therefor.

In Column 52, Line 27, delete "billing" and insert -- billing. --, therefor.

Signed and Sealed this
Twenty-sixth Day of February, 2013

Teresa Stanek Rea
*Acting Director of the United States Patent and Trademark Office*